(12) United States Patent
Sugiura

(10) Patent No.: US 11,526,057 B2
(45) Date of Patent: Dec. 13, 2022

(54) LIQUID CRYSTAL DEVICE COMPRISING A WALL PORTION EXTENDING ALONG A THIRD END AND A FOURTH END OF A PIXEL ELECTRODE AND COVERED WITH THE PIXEL ELECTRODE

(71) Applicant: SEIKO EPSON CORPORATION, Tokyo (JP)

(72) Inventor: Yukihiro Sugiura, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/558,504

(22) Filed: Dec. 21, 2021

(65) Prior Publication Data

US 2022/0197093 A1    Jun. 23, 2022

(30) Foreign Application Priority Data

Dec. 23, 2020   (JP) .............................. JP2020-213281

(51) Int. Cl.
  *G02F 1/1362*   (2006.01)
  *G02F 1/1343*   (2006.01)
  *G02F 1/1335*   (2006.01)

(52) U.S. Cl.
  CPC .. *G02F 1/136209* (2013.01); *G02F 1/133512* (2013.01); *G02F 1/134336* (2013.01); *G02F 1/136227* (2013.01)

(58) Field of Classification Search
  CPC ................................................ G02F 1/133757
  See application file for complete search history.

(56) References Cited

U.S. PATENT DOCUMENTS

| 6,057,905 A | 5/2000 | Nakajima |
| 6,683,592 B1 | 1/2004 | Murade |
| 2019/0265540 A1* | 8/2019 | Terada .............. G02F 1/134309 |
| 2019/0317361 A1* | 10/2019 | Ito ..................... G02F 1/136209 |
| 2021/0165290 A1 | 6/2021 | Sugiura |

FOREIGN PATENT DOCUMENTS

| CN | 103439842 A | * 12/2013 | ....... G02F 1/133707 |
| CN | 104950531 A | * 9/2015 | |
| JP | H11109405 | 4/1999 | |
| JP | 2000111955 | 4/2000 | |
| JP | 2004004939 | 1/2004 | |
| JP | 2005121805 | 5/2005 | |
| JP | 2016095443 | 5/2016 | |
| JP | 2019148625 | 9/2019 | |
| JP | 2021086011 | 6/2021 | |

* cited by examiner

*Primary Examiner* — Paul C Lee
(74) *Attorney, Agent, or Firm* — JCIPRNET

(57) ABSTRACT

A liquid crystal device is provided with a first light shielding member, a second light shielding member, a third light shielding member, and a fourth light shielding member along four edges of a pixel electrode, respectively, and liquid crystal molecules are oriented so as to intersect a first direction and a second direction and head toward an intersection region of the third light shielding member and the fourth light shielding member. The pixel electrode covers a wall portion on a lower layer side, in a region overlapping with the third light shielding member and the fourth light shielding member. The wall portion includes a layered film including a first layer, and a second layer made of a material different from the first layer, and the first layer on a lower layer side is an etching stopper when the second layer is formed.

8 Claims, 13 Drawing Sheets

LIQUID CRYSTAL DEVICE COMPRISING A WALL PORTION EXTENDING ALONG A THIRD END AND A FOURTH END OF A PIXEL ELECTRODE AND COVERED WITH THE PIXEL ELECTRODE

The present application is based on, and claims priority from JP Application Serial Number 2020-213281, filed Dec. 23, 2020, the disclosure of which is hereby incorporated by reference herein in its entirety.

BACKGROUND

1. Technical Field

The present disclosure relates to a liquid crystal device and an electronic apparatus.

2. Related Art

A liquid crystal device includes a first substrate having a surface provided with a plurality of pixel electrodes having translucency and a first oriented film covering the plurality of pixel electrodes, a second substrate having a surface facing the first substrate and provided with a second oriented film adjacent to the surface, and a liquid crystal layer provided between the first substrate and the second substrate. End portions of the plurality of pixel electrodes each overlaps a first light shielding portion extending in a first direction, and a second light shielding portion extending in a second direction. In such a liquid crystal device, for an opening portion surrounded by the first light shielding portion and the second light shielding portion, a structure has been proposed in which a size in the second direction is less than a size in the first direction, and a width in the second direction of the first light shielding portion is greater than a width in the first direction of the second light shielding portion (see JP 2019-148625 A). Additionally, a shift of a center of the pixel electrode toward a pre-tilt orientation of liquid crystal molecules in a direction along the second direction with respect to a center of the opening portion has been proposed. According to such a configuration, even when orientation of the liquid crystal molecules is disturbed due to effects of a lateral electric field generated between the pixel electrodes adjacent in the second direction, a range in which a region where the orientation disturbance has occurred protrudes from the second light shielding portion can be narrowed, thus, a reduction in contrast caused by the lateral electric field can be suppressed.

However, in the technique described in JP 2019-148625 A, the structure in which the width of the light shielding portion where the orientation disturbance caused by the lateral electric field is generated is increased to hide the effects of the lateral electric field is adopted, as a result, the width of the light shielding portion is to be increased in order to reliably hide the orientation disturbance caused by the lateral electric field. As a result, a reduction in an amount of display light occurs. Thus, in the configuration described in JP 2019-148625 A, there is a problem in that a bright image cannot be displayed, when the effects of orientation disturbance of the liquid crystal molecules caused by the lateral electric field is suppressed to increase an image contrast ratio.

SUMMARY

In order to solve the above-described problems, an aspect of a liquid crystal device according to the present disclosure includes a liquid crystal layer including liquid crystal molecules, a pixel electrode including a first end extending along a first direction, a second end intersecting the first end, and extending along a second direction, a third end intersecting the second end, and extending along the first direction, and a fourth end intersecting the first end and the third end, and extending along the second direction, a transistor provided corresponding to the pixel electrode, and a wall portion extending along the third end and the fourth end of the pixel electrode, and covered with the pixel electrode, wherein the wall portion includes a first layer, and a second layer stacked, from the pixel electrode side, at the first layer so that the second layer entirely overlaps the first layer in plan view, and the second layer is made of a material different from the first layer, and is thicker than the first layer.

Another aspect of the present disclosure is a method of manufacturing a liquid crystal device including a liquid crystal layer having liquid crystal molecules, a pixel electrode having a first end extending along a first direction, a second end extending along a second direction intersecting the first direction, a third end intersecting the second end, and extending along the first direction, and a fourth end intersecting the first end and the third end, and extending along the second direction, a transistor provided corresponding to the pixel electrode, and a wall portion extending along the third end and the fourth end of the pixel electrode, and covered with the pixel electrode, wherein in a step for forming the wall portion, a step for forming a first film for forming a first layer that is a lower layer side portion of the wall portion, a step for forming a second film for forming a second layer that is an upper layer side portion of the wall portion on an upper layer side of the first film, with a material different from the first film, a step for patterning the second film to form the second layer with the first film as an etching stopper, and a step for removing a portion of the first film exposed from the second layer to form the first layer are performed.

An electronic apparatus according to the present disclosure includes a liquid crystal device to which the present disclosure is applied, and an optical path shifting device.

DESCRIPTION OF EXEMPLARY EMBODIMENTS

Exemplary embodiments of the disclosure will be described below with reference to the drawings. The accompanying drawings to be referenced are appropriately scaled up or down or otherwise exaggerated to allow parts to be described in a fully recognizable manner. Other components than components needed to be described may sometimes be omitted. In addition, in the description below, the term "in plan view" represents a state viewed from a normal line direction of a first substrate 10 and a pixel electrode 9a.

Exemplary Embodiment 1

1. Configuration of Liquid Crystal Device

Figure 1:
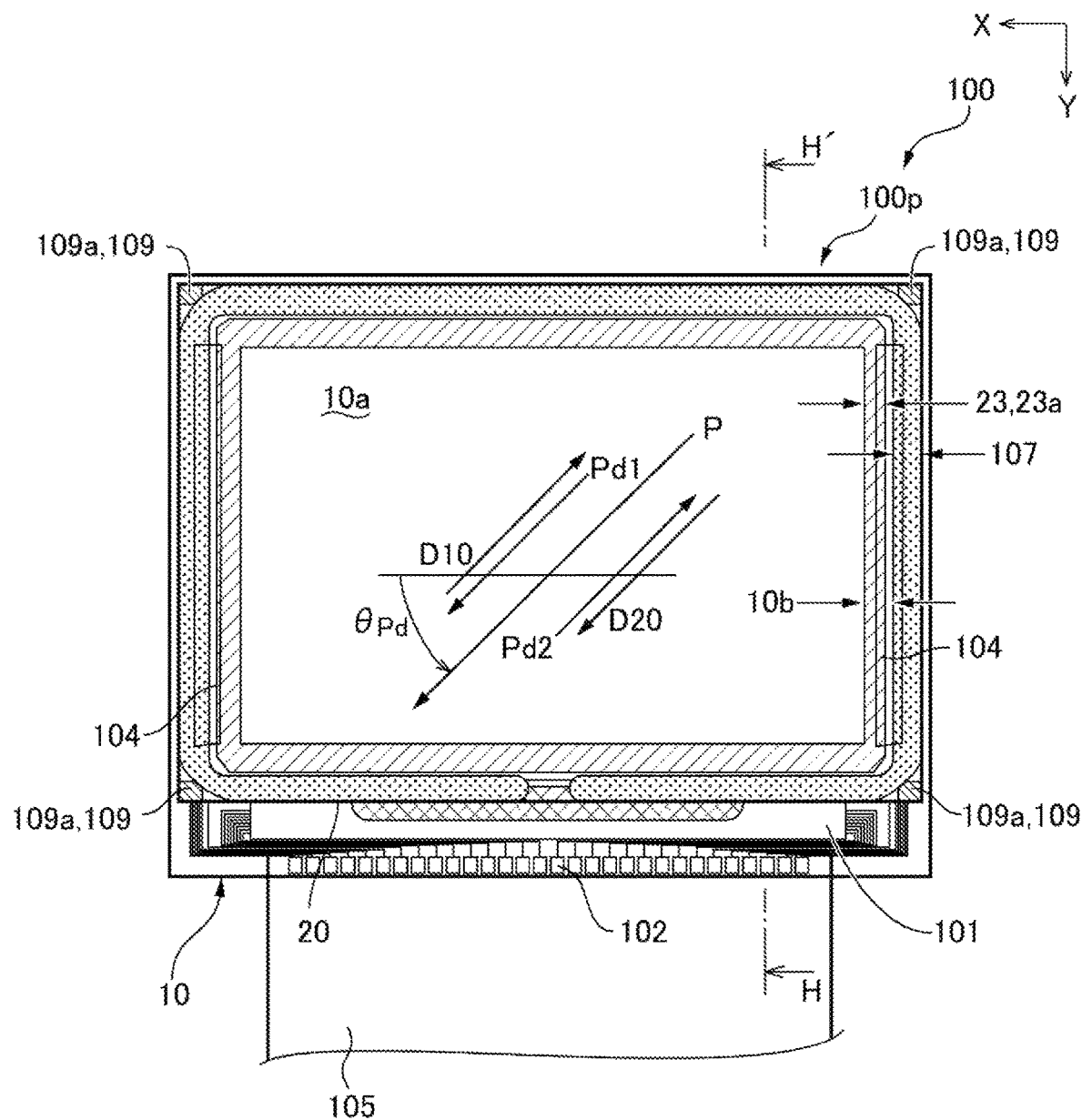
FIG. 1 is a plan view illustrating a specific configuration example of a liquid crystal device according to Exemplary Embodiment 1 of the disclosure.
Figure 2:
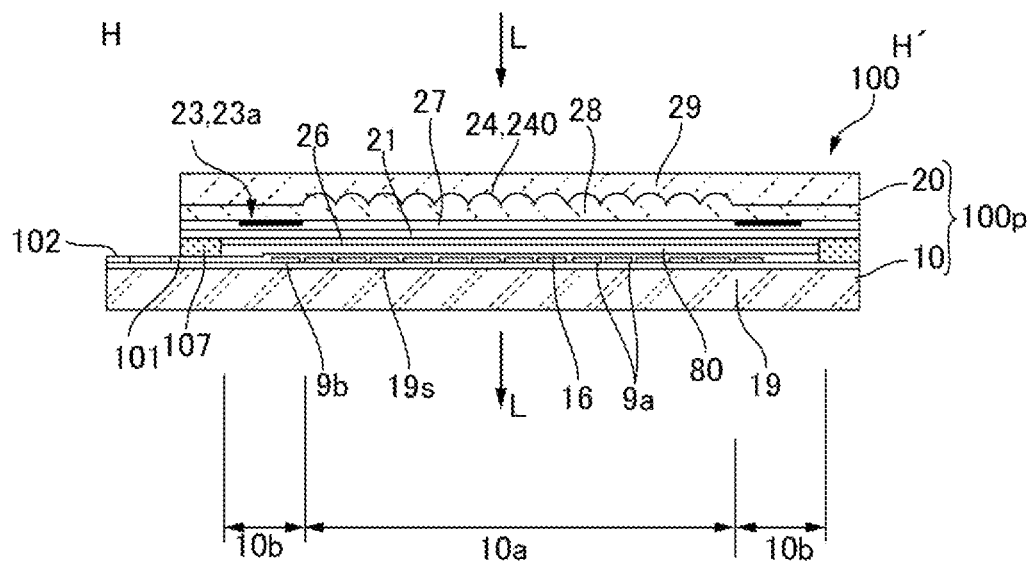
FIG. 2 is an H-H' cross-sectional view of the liquid crystal device illustrated in FIG. 1.

FIG. 1 is a plan view illustrating a specific configuration example of a liquid crystal device 100 according to Exemplary Embodiment 1 of the disclosure. FIG. 1 illustrates a state where the liquid crystal device 100 is viewed from the side of a second substrate 20. FIG. 2 is an H-H' cross-sectional view of the liquid crystal device 100 illustrated in FIG. 1.

As illustrated in FIGS. 1 and 2, the liquid crystal device 100 includes a liquid crystal panel 100p including a light-transmitting first substrate 10 and a light-transmitting second substrate 20 bonded to each other by a sealing material 107 in a predetermined gap. The sealing material 107 is provided along an outer edge of the second substrate 20 to have a frame shape, and a liquid crystal layer 80 is disposed in a region surrounded by the sealing material 107 between the first substrate 10 and the second substrate 20. The first substrate 10 and the second substrate 20 both have a quadrangle shape, and in a substantially center portion of the liquid crystal device 100, a display region 10a is provided as a rectangular region where a size in a first direction X, which is a size in a 0300-0900 o'clock direction, is longer than a size in a second direction Y, which is a size in a 0000-0600 o'clock direction. In accordance with the above shapes, the sealing material 107 is also formed in a substantially rectangular frame shape, and a peripheral region 10b in a quadrangular frame shape is provided between an inner peripheral edge of the sealing material 107 and an outer peripheral edge of the display region 10a.

The first substrate 10 includes a transmissive substrate body 19 made of quartz, glass or the like. On a side of one surface 19s of the substrate body 19 facing a side of the second substrate 20, at an outside of the display region 10a, a data line driving circuit 101 and a plurality of terminals 102 are formed along one side extending in the first direction X of the first substrate 10 on a 0600 o'clock side. Scanning line drive circuits 104 are respectively formed along two sides extending in the second direction Y. A flexible wiring substrate 105 is coupled to the terminal 102, and various potentials and various signals are input to the first substrate 10 via the flexible wiring substrate 105.

In the display region 10a on the one surface 19s of the substrate body 19, a plurality of the pixel electrodes 9a having translucency and formed of ITO (Indium Tin Oxide) film or the like, and a transistor for pixel switching (not illustrated) electrically coupled to each of the plurality of pixel electrodes 9a are formed in a matrix pattern. A first oriented film 16 is formed at the second substrate 20 side with respect to the pixel electrodes 9a. Accordingly, the first oriented film 16 from the substrate body 19 correspond to the first substrate 10.

The second substrate 20 includes a transmissive substrate body 29 made of quartz, glass, or the like. A transmissive common electrode 21 made of an ITO film or the like is formed on one surface 29s side of the substrate body 29 facing the first substrate 10 side, and a second oriented film 26 is formed with respect to the common electrode 21 on the first substrate 10 side. Accordingly, the second oriented film 26 from the substrate body 29 correspond to the second substrate 20. The common electrode 21 is formed substantially entirely at the second substrate 20.

In the second substrate 20, opposite to the first substrate 10 with respect to the common electrode 21, a light shielding film 23 made of metal or a metal compound and having a light shielding property and a transmissive protective film 27 are formed. The light shielding film 23 is formed, for example, as a partition 23a in a frame shape extending along the outer peripheral edge of the display region 10a. The light shielding film 23 may be formed as a grid-like black matrix in a region overlapping in plan view with a region located between pixel electrodes 9a adjacent to each other. Regions overlapping, when viewed in plan view, with the partition 23a in the peripheral region 10b of the first substrate 10 are formed with dummy pixel electrodes 9b formed simultaneously with the pixel electrodes 9a.

A lens 24 facing each of the plurality of pixel electrodes 9a is configured at the second substrate 20. Specifically, a lens surface including a recessed curved surface 240 is formed at the substrate body 29, and the recessed curved surface 240 is covered with a lens layer 28. The lens layer 28 has a refractive index larger than a refractive index of the substrate body 29. For example, the substrate body 29 is formed of a quartz substrate (silicon oxide, SiO2), and has a refractive index of 1.48. Meanwhile, the lens layer 28 is formed of a silicon oxynitride film (SiON), and has a refractive index from 1.58 to 1.68. Thus, the lenses 24 have positive power for converging light. In the exemplary embodiment, a light shielding film 23 and a protective film 27 are formed on the first substrate 10 side with respect to the lens layer 28.

The first substrate 10 includes an inter-substrate conduction electrode 109 being formed in a region positioning outside the sealing material 107 and overlapping with a corner portion of the second substrate 20 such that electrical conduction is established between the first substrate 10 and the second substrate 20. An inter-substrate conduction material 109a including conductive particles is disposed in the inter-substrate conduction electrode 109. The common electrode 21 of the second substrate 20 is electrically coupled to the first substrate 10 side via the inter-substrate conduction material 109a and the inter-substrate conduction electrode 109. Therefore, a common potential is applied to the common electrode 21 from the first substrate 10 side.

The liquid crystal device 100 of Exemplary Embodiment 1 is configured as a transmissive-type liquid crystal device. The transmissive-type liquid crystal device displays an image in such a manner that light incident from one substrate side of the first substrate 10 and the second substrate 20 is modulated while transmitted through another substrate side to be emitted. In the exemplary embodiment, while light entered from the second substrate 20, as indicated by an arrow L in FIG. 2, passes through and exits from the first substrate 10, the light is modulated by the liquid crystal layer 80 for each of the pixels. An image is thus displayed.

2. Electrical Configuration of Liquid Crystal Device 100

Figure 3:
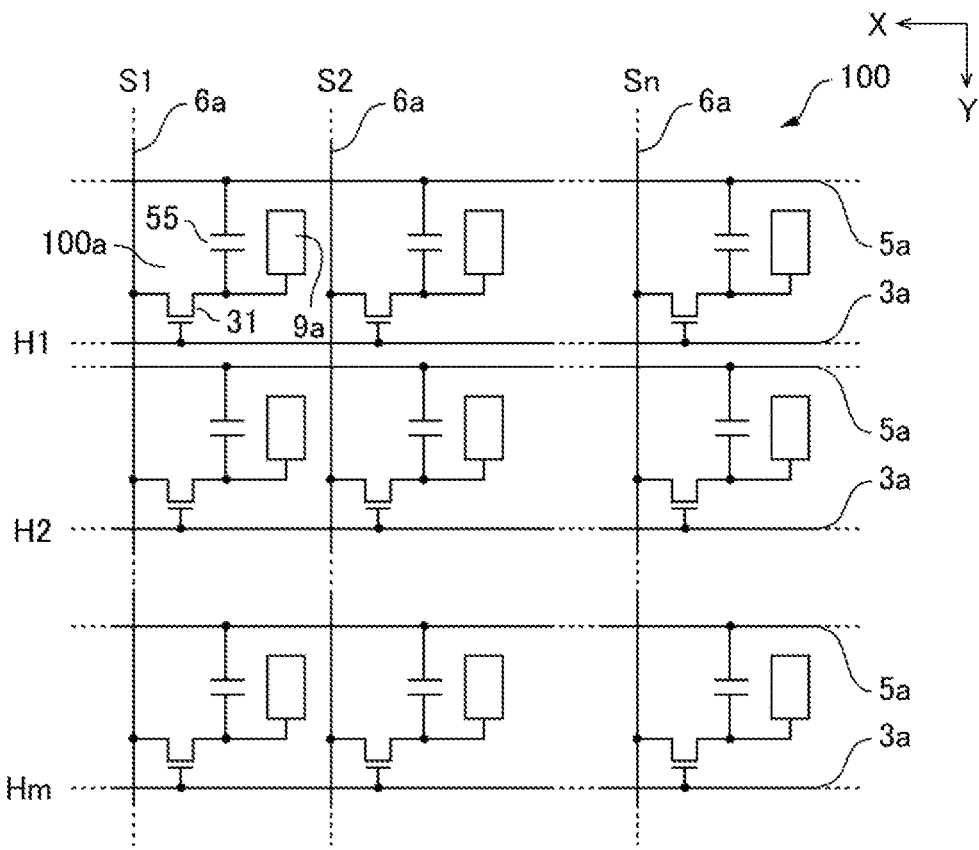
FIG. 3 is an explanatory view illustrating an electrical configuration of the liquid crystal device illustrated in FIG. 1.

FIG. 3 is an explanatory view illustrating an electrical configuration of the liquid crystal device 100 illustrated in FIG. 1. As illustrated in FIG. 3, in the display region 10a of the liquid crystal device 100, for each of a plurality of pixels 100a formed in a matrix, the pixel electrodes 9a and transistors 31 corresponding to the pixel electrode 9a are formed. Data lines 6a configured to supply image signals S1, S2, . . . Sn are electrically coupled to sources of the transistors 31. The image signals S1, S2, . . . Sn to be written in the data lines 6a may be sequentially supplied to the lines in the stated order, or may be supplied for each group including the plurality of data lines 6a that are adjacent to each other. Scanning lines 3a are electrically coupled to gates of the transistors 31, and the scanning lines 3a apply scanning signals H1, H2, . . . Hm sequentially to the gates at a predetermined timing. The pixel electrodes 9a are electrically coupled to drains of the transistors 31, and write image signals S1, S2, . . . Sn, which are supplied from the data lines 6a, in each of the pixels 100a at a predetermined timing by turning the transistors 31 into an ON-state for a certain time period. In this manner, the image signals S1, S2, . . . Sn that are written in the pixels 100a via the pixel electrodes 9a are retained for a certain time period together with the common electrode 21 of the second substrate 20 described with reference to FIG. 2. In the liquid crystal layer 80, orientation and order of molecular assembly are changed by a level of voltage to be applied, and accordingly, the liquid crystal layer 80 modulates the light and enables gradation display. Therefore, the light having contrast corresponding to the image signals S1, S2, . . . Sn exits from the liquid crystal device 100.

Here, in some cases, in order to prevent the image signals S1, S2, . . . Sn retained for each of the pixels 100a from leaking, each retaining capacity 55 may be added in parallel with liquid crystal capacity formed between each of the pixel electrodes 9a and the common electrode 21 by using capacitance lines 5a. In this case, the voltage of each of the pixel electrodes 9a is retained by the retaining capacity 55 for a time period longer than a time period for which the source voltage is applied. With this, a charge retention property is improved, and the liquid crystal device 100 of an active matrix type with a high contrast ratio can be achieved.

3. Configuration of Liquid Crystal Layer 80 and Other Components

Figure 4:
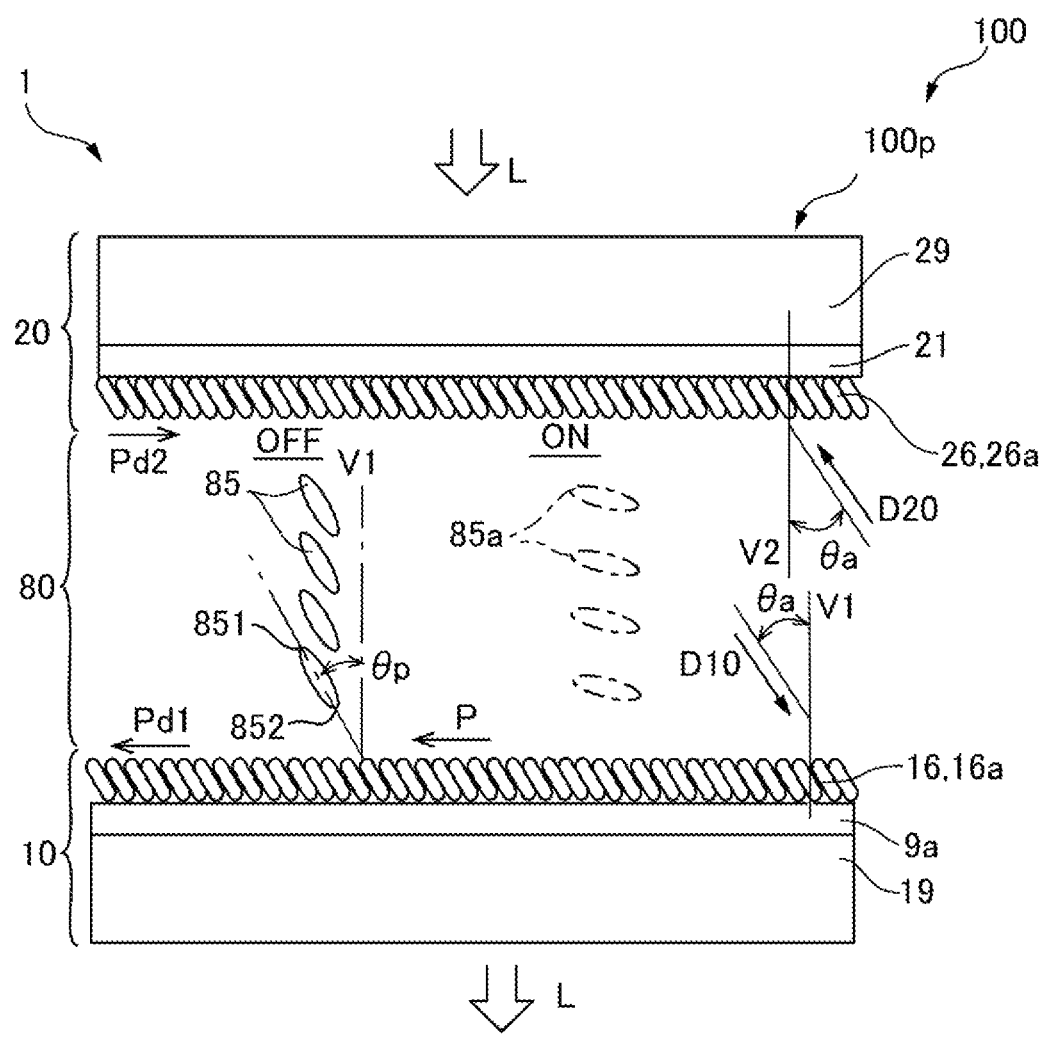
FIG. 4 is an explanatory view illustrating liquid crystal molecules and the like used in the liquid crystal device illustrated in FIG. 1.

FIG. 4 is an explanatory view illustrating liquid crystal molecules 85 and the like used in the liquid crystal device 100 illustrated in FIG. 1. In FIG. 4, the first oriented film 16 and the second oriented film 26 include a polyimide film or an inorganic alignment film. In the exemplary embodiment, the first oriented film 16 and the second oriented film 26 are inorganic oblique deposition films made of $SiO_x$ (x<2), $SiO_2$, $TiO_2$, MgO, or $Al_2O_3$, for example.

Accordingly, the first oriented film 16 and the second oriented film 26 each include a columnar structure in which respective columnar bodies 16a or 26a each named a column are obliquely formed with respect to both the first substrate 10 and the second substrate 20. Thus, in the first oriented film 16 and the second oriented film 26, the liquid crystal molecules 85 having negative dielectric anisotropy and used in the liquid crystal layer 80 are oriented diagonally with respect to the first substrate 10 and the second substrate 20 to allow the liquid crystal molecules 85 to be pre-tilted. While no voltage is applied between each of the pixel electrodes 9a and the common electrode 21, a pre-tilt angle θp denotes an angle formed between a vertical normal line direction of the first substrate 10 and the second substrate 20 and a long axis direction of the liquid crystal molecules 85. The pre-tilt angle θp substantially ranges from 3° to 5°, for example.

A pre-tilt orientation Pd1 of the liquid crystal molecules 85 with respect to the first substrate 10 is an orientation in which a first end portion 851 on an opposite side to the first substrate 10 in the long axis direction of the liquid crystal molecules 85 is positioned with respect to a second end portion 852 on the first substrate 10 side. In the liquid crystal device 100, when a drive voltage is applied between the pixel electrode 9a and the common electrode 21, the liquid crystal molecules 85 incline in the pre-tilt orientation Pd1. A pre-tilt orientation Pd2 of the liquid crystal molecules 85 with respect to the second substrate 20 is antiparallel to the pre-tilt orientation Pd1 of the liquid crystal molecules 85 with respect to the first substrate 10.

In this way, the liquid crystal device 100 is configured as a liquid crystal device of a Vertical Alignment (VA) mode. Further, the liquid crystal device 100 is disposed between a pair of polarizing elements disposed in a crossed Nicol state, to allow the pre-tilt orientation Pd1, which is a pre-tilt direction, to form an angle θPd of 45° with respect to a transmission axis or an absorption axis of the pair of polarizing elements (see FIG. 1). Transmittance of incident light therefore increases in accordance with a voltage applied between the pixel electrode 9a and the common electrode 21 for each of the pixels. The liquid crystal device 100 displays an image in the normally black mode where each pixel emits light at a degree of contrast in accordance with an image signal as a whole.

In the exemplary embodiment, as illustrated in FIG. 1, a vapor deposition direction D10 when the first oriented film 16 is formed is an orientation heading from 0730 o'clock to 0130 o'clock, and an angle formed by the vapor deposition direction D10 and a normal line V1 with respect to the first substrate 10 is θa (see FIG. 4). At that time, a direction in which the columnar body 16a grows is an orientation heading from 0730 o'clock to 0130 o'clock. In the exemplary embodiment, the pre-tilt orientation Pd1, which is the pre-tilt direction of the liquid crystal molecules 85 with respect to the first substrate 10 is an orientation heading from 0130 o'clock to 0730 o'clock. A vapor deposition direction D20 when the second oriented film 26 is formed is an orientation heading from 0130 o'clock toward 0730 o'clock, and an angle formed by the vapor deposition direction D20 and a normal line V2 with respect to the second substrate 20 is θa (see FIG. 4). At that time, a direction in which the columnar body 26a grows is an orientation heading from 0730 o'clock to 0130 o'clock. The pre-tilt orientation Pd2 of the liquid crystal molecules 85 with respect to the second substrate 20 is an orientation heading from 0730 o'clock to 0130 o'clock. Therefore, the pre-tilt orientations Pd1 and Pd2 of the liquid crystal molecules 85 intersect each of the first direction X and the second direction Y at an angle of 45°. Hereinafter, the pre-tilt orientation Pd1 is an orientation direction of the liquid crystal molecules 85 (pre-tilt direction P). Thus, the pre-tilt direction P is a direction heading from 0130 o'clock to 0730 o'clock.

4. Specific Configuration of Pixel

Figure 5:
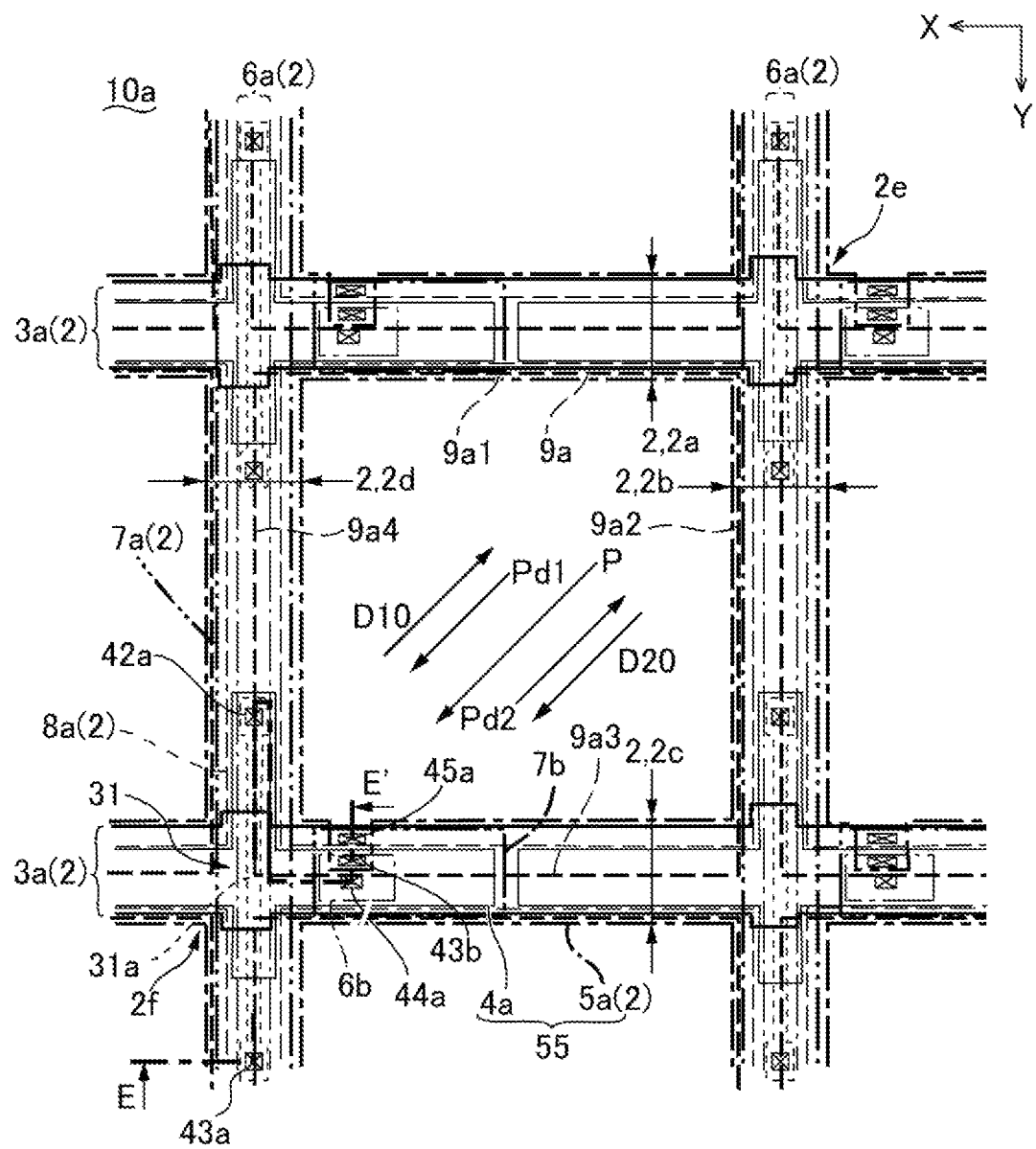
FIG. 5 is a plan view of a pixel of the liquid crystal device illustrated in FIG. 1.
Figure 6:
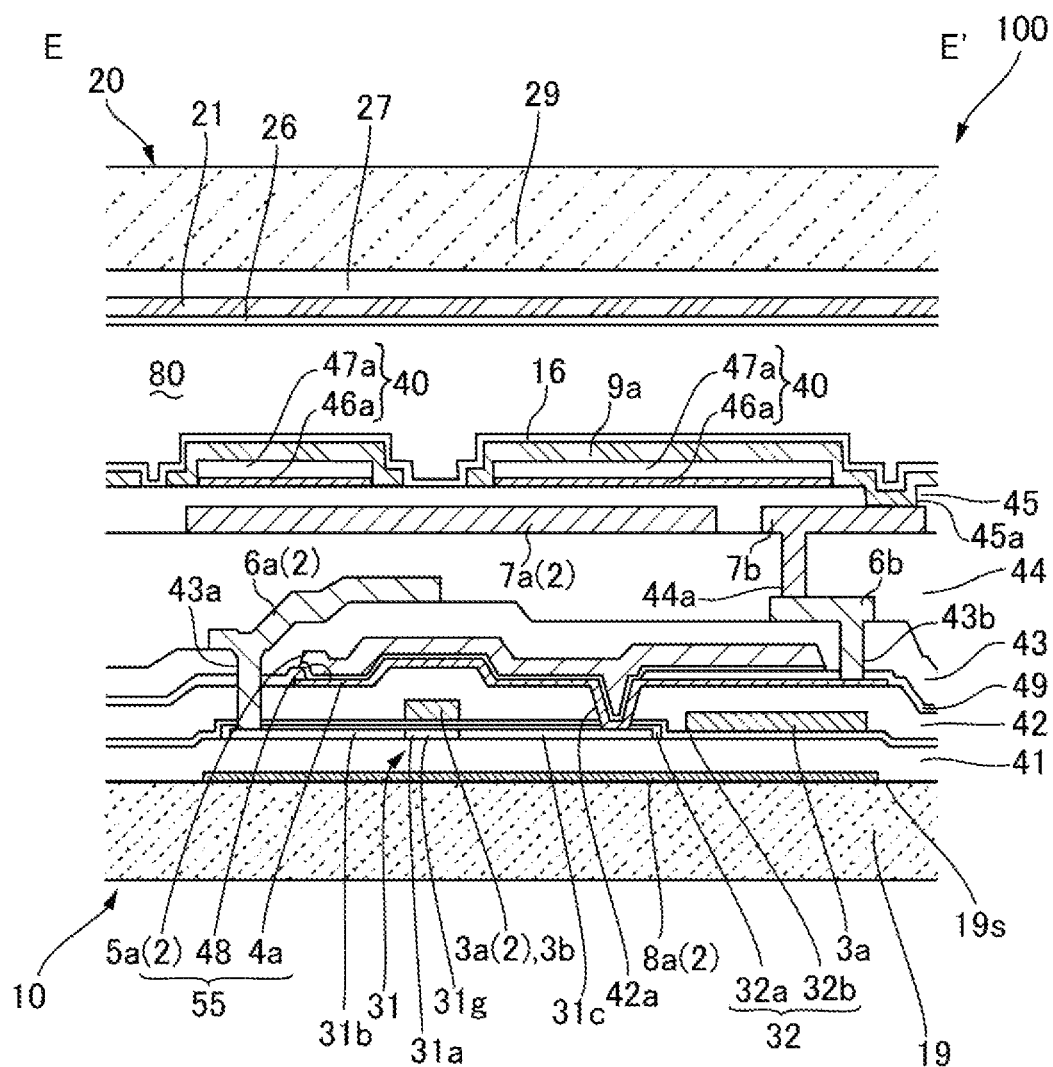
FIG. 6 is an E-E' cross-sectional view of the pixel illustrated in FIG. 5.

FIG. 5 is a plan view of a pixel of the liquid crystal device 100 illustrated in FIG. 1. FIG. 6 is the E-E' cross-sectional view of the pixel illustrated in FIG. 5. Note that, in FIG. 5, each layer is indicated by a line described below. Moreover, note that, in FIG. 5, as for layers including ends overlapping each other in plan view, positions of the end portions are displaced to make shapes and the like of the layers readily recognizable.

A first light shielding film 8a: a thin and long dashed line
A semiconductor film 31a: a thin and short dotted line
The scanning line 3a: a thick solid line
A drain electrode 4a: a thin solid line
The data line 6a and a relay electrode 6b: a thin long dashed short dashed line
The capacitance line 5a: a thick long dashed short dashed line
A second light shielding film 7a and a relay electrode 7b: a thick long dashed double-short dashed line
The pixel electrode 9a: a thick dashed line As illustrated in FIG. 5, the surface 10s of the first substrate 10 is formed with the plurality of pixel electrodes 9a, and the data lines 6a and the scanning lines 3a are formed along inter-pixel regions sandwiched by the pixel electrodes 9a adjacent to each other. The inter-pixel regions extend lengthwise and crosswise. The scanning lines 3a linearly extend along first inter-pixel regions extending in the first direction X of the inter-pixel regions, and the data lines 6a linearly extend along second inter-pixel regions extending in the second direction Y of the inter-pixel regions. Further, the transistor 31 and the pixel electrode 9a are formed to correspond to an intersection of the data line 6a and the scanning line 3a, and the transistor 31 is formed by using an intersection region of the data line 6a and the scanning line 3a and a vicinity thereof. The capacitance lines 5a are formed on the first substrate 10, and a common potential Vcom is applied to the capacitance lines 5a. The capacitance lines 5a extend to overlap the scanning lines 3a and the data line 6a, and are formed to have a lattice shape. On an upper layer side of the transistor 31, the second light shielding film 7a is formed, and the second light shielding film 7a extends to overlap with the data lines 6a. On a lower layer side of the transistor 31, the first light shielding film 8a is formed, and the first light shielding film 8a extends to overlap with the scanning lines 3a and the data lines 6a. In this manner, a grid shaped light shielding member 2 extending along an end portion of the plurality of pixel electrodes 9a is formed, by the first light shielding film 8a, the scanning line 3a, the capacitance line 5a, the data line 6a, and the second light shielding film 7a.

As illustrated in FIG. 6, on the first substrate 10, the first light shielding film 8a including a conductive film such as a conductive polysilicon film, a metal silicide film, a metal film, or a metal compound film is formed on the one surface 19s side of the substrate body 19. In the exemplary embodiment, the first light shielding film 8a includes, for example, a light shielding film of tungsten silicide (WSi), tungsten, or titanium nitride, and prevents the light from entering the semiconductor film 31a and causing an erroneous operation in the transistor 31 due to photoelectric current. The first light shielding film 8a may be configured as a scanning line. In this case, the following configuration to be described later is obtained. That is, the gate electrode 3b and the first light shielding film 8a are brought into conduction with each other.

On the first substrate 10, on an upper layer side of the first light shielding film 8a, a transmissive inter-layer insulating film 41 including, for example, a silicon oxide film is formed. On an upper layer side of the inter-layer insulating film 41, the transistor 31 including the semiconductor film 31a is formed. The transistor 31 is a Thin Film Transistor (TFT), which includes the semiconductor film 31a and the gate electrode 3b. The semiconductor film 31a has a longitudinal direction oriented in an extending direction of the data line 6a. The gate electrode 3b extends in a direction orthogonal to a longitudinal direction of the semiconductor film 31a, and overlaps with a central part of the semiconductor film 31a in the longitudinal direction. In the exemplary embodiment, the gate electrode 3b includes a part of the scanning line 3a. The transistor 31 includes a transmissive gate insulating film 32 between the semiconductor film 31a and the gate electrode 3b. The semiconductor film 31a includes a channel region 31g facing the gate electrode 3b via the gate insulating film 32, and also includes a source region 31b and a drain region 31c on one side and the other side of the channel region 31g, respectively. The transistor 31 has an LDD structure. Thus, on both the sides of the channel region 31g, each of the source region 31b and the drain region 31c has a low-concentration region. In a region adjacent to a side opposite to the channel region 31g with respect to the low-concentration region, each of the source region 31b and the drain region 31c has a high-concentration region.

The semiconductor film 31a includes a polysilicon film. The gate insulating film 32 has a two-layer structure including a first gate insulating film 32a including a silicon oxide film that is obtained by thermally oxidizing the semiconductor film 31a, and a second gate insulating film 32b including a silicon oxide film that is formed by using, for example, the low pressure CVD method. The gate electrode 3b and the scanning line 3a each include a conductive film such as a conductive polysilicon film, a metal silicide film, a metal film, or a metal compound film.

On an upper layer side of the gate electrode 3b, a transmissive inter-layer insulating film 42 including, for example, a silicon oxide film is formed. At an upper layer of the inter-layer insulating film 42, a drain electrode 4a is formed. The drain electrode 4a includes a conductive film such as a conductive polysilicon film, a metal silicide film, a metal film, or a metal compound film. The drain electrode 4a is conductive to the drain region 31c via a contact hole 42a that penetrates the inter-layer insulating film 42, and the gate insulating film 32.

At an upper layer of the drain electrode 4a, a transmissive protective film 49 including, for example, a silicon oxide film, and a transmissive dielectric film 48 are formed. At an upper layer of the dielectric film 48, the capacitance line 5a is formed. As the dielectric film 48, a silicon compound such as a silicon oxide film or a silicon nitride film can be used. In addition, a dielectric film having a high dielectric constant such as an aluminum oxide film, a titanium oxide film, a tantalum oxide film, a niobium oxide film, a hafnium oxide film, a lantern oxide film, and a zirconium oxide film can be used. The capacitance line 5a includes a conductive film such as a conductive polysilicon film, a metal silicide film, a metal film, or a metal compound film. The capacitance line 5a overlaps with the drain electrode 4a via the dielectric film 48, and forms the retaining capacity 55.

At the upper layer of the capacitance line 5a, the inter-layer insulating film 43 having translucency and including, for example, a silicon oxide film is formed. At the upper layer of the inter-layer insulating film 43, the data line 6a and the relay electrode 6b are formed of the same conductive film. The data line 6a and the relay electrode 6b each include a conductive film such as a conductive polysilicon film, a metal silicide film, a metal film, or a metal compound film. The data line 6a is brought into conduction with the source region 31b via a contact hole 43a passing through the inter-layer insulating film 43, the protective film 49, the inter-layer insulating film 42, and the gate insulating film 32. The relay electrode 6b is brought into conduction with the drain electrode 4a via a contact hole 43b passing through the inter-layer insulating film 43 and the protective film 49.

At an upper layer of the data line 6a and the relay electrode 6b, a transmissive inter-layer insulating film 44 including, for example, a silicon oxide film is formed. At an upper layer of the inter-layer insulating film 44, the second light shielding film 7a and the relay electrode 7b are formed of the same conductive film. The inter-layer insulating film 44 includes a flattened surface. The second light shielding film 7a and the relay electrode 7b include a conductive film such as a conductive polysilicon film, a metal silicide film, a metal film, or a metal compound film. The relay electrode 7b is in conduction with the relay electrode 6b via a contact hole 44a passing through the inter-layer insulating film 44. The second light shielding film 7a extends to overlap with the data line 6a. Note that, the second light shielding film 7a may be brought into conduction with the capacitance line 5a and used as a shield by applying a common potential Vcom, which is a constant potential.

At an upper layer of the second light shielding film 7a and the relay electrode 7b, a transmissive inter-layer insulating film 45 including, for example, a silicon oxide film is formed. At an upper layer of the inter-layer insulating film 45, the pixel electrode 9a including an ITO film is formed. A contact hole 45a reaching the relay electrode 7b is formed in the inter-layer insulating film 45. The pixel electrode 9a is electrically coupled to the relay electrode 7b via the contact hole 45a. As a result, the pixel electrode 9a is electrically coupled to the drain region 31c via the relay electrode 7b, the relay electrode 6b, and the drain electrode 4a. The inter-layer insulating film 45 includes a flattened surface. The first oriented film 16 is formed on surfaces of the pixel electrodes 9a.

5. Layout of Light Shielding Member 2 and the Like

Figure 7:
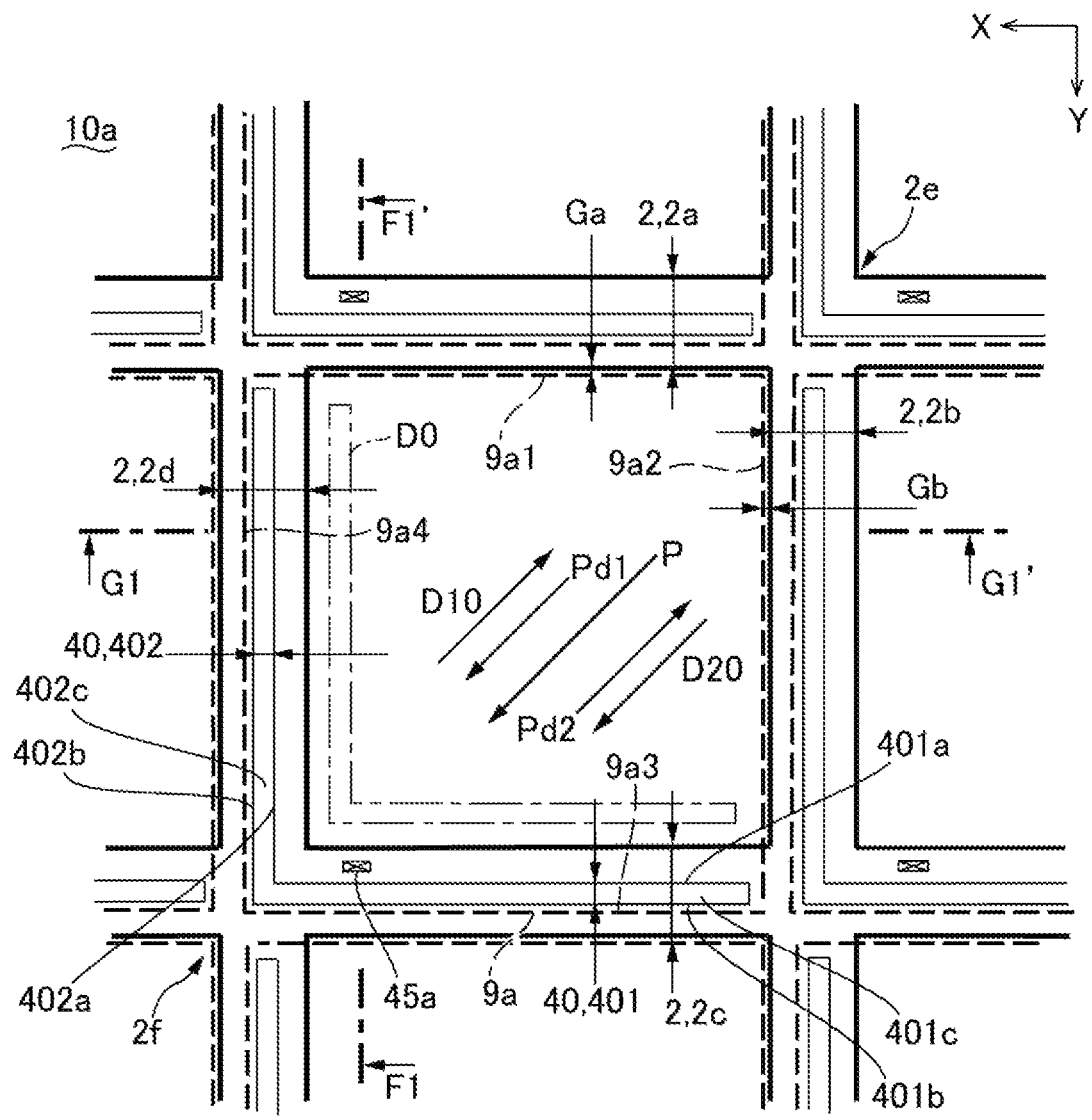
FIG. 7 is an explanatory view schematically illustrating a layout of a light shielding member and the like illustrated in FIG. 5.

FIG. 7 is an explanatory view schematically illustrating a layout of the light shielding member 2 or the like illustrated in FIG. 5. Note that, in FIG. 7, each layer is indicated by a line described below. In addition, in an existing liquid crystal device in which a wall portion 40 described below is not formed, a portion DO in which a domain is likely to occur is indicated by a thin long dashed short dashed line.

The light shielding member 2: a thick solid line
The pixel electrode 9a: a thick dashed line
The wall portion 40: a thin solid line As illustrated in FIG. 6, the light shielding member 2 formed from the first light shielding film 8a, the scanning line 3a, the capacitance line 5a, the data line 6a, and the second light shielding film 7a is formed between the substrate body 19 and the pixel electrode 9a, and the light shielding member 2 extends in the first direction X and the second direction Y along boundaries of the plurality of pixel electrodes 9a. The plurality of pixel electrodes 9a have the same configuration. Therefore, focusing on one pixel electrode 9a of the plurality of pixel electrodes 9a, as illustrated in FIG. 5 and FIG. 7, the pixel electrode 9a includes a first end 9a1 that extends along the first direction X and a second end 9a2 that extends along the second direction Y, and the second end 9a2 intersects the first end 9a1. Further, the pixel electrode 9a includes a third end 9a3 that extends along the first direction X so as to face the first end 9a1, and a fourth end 9a4 that extends along the second direction Y so as to face the second end 9a2, the third end 9a3 intersects the second end 9a2, and the fourth end 9a4 intersects the first end 9a1 and the third end 9a3.

The light shielding member 2 includes a first light shielding member 2a extending along the first direction X, and a second light shielding member 2b extending along the second direction Y, and the second light shielding member 2b intersects the first light shielding member 2a. Further, the light shielding member 2 includes a third light shielding member 2c extending along the first direction X so as to face the first light shielding member 2a, and a fourth light shielding member 2d extending along the second direction Y so as to face the second light shielding member 2b, the third light shielding member 2c intersects the second light shielding member 2b, and the fourth light shielding member 2d intersects the first light shielding member 2a and the third light shielding member 2c.

Accordingly, an edge of the pixel electrode 9a extends along the light shielding member 2. More specifically, the first end 9a1 extends along the first light shielding member 2a, the second end 9a2 extends along the second light shielding member 2b, the third end 9a3 extends along the third light shielding member 2c, and the fourth end 9a4 extends along the fourth light shielding member 2d. The first light shielding member 2a and the third light shielding member 2c are equal in width (dimension in a direction intersecting the extending direction), the second light shielding member 2b and the fourth light shielding member 2d are equal in width. In the exemplary embodiment, the first light shielding member 2a, the second light shielding member 2b, the third light shielding member 2c, and the fourth light shielding member 2d are all equal in width.

Here, when an intersection region of the first light shielding member 2a and the second light shielding member 2b is a first intersection region 2e, and an intersection region between the third light shielding member 2c and the fourth light shielding member 2d is a second intersection region 2f, the orientation direction (pre-tilt direction P) of the liquid crystal molecules 85 described with reference to FIG. 1 and FIG. 4 is a direction that intersects the first direction X and the second direction Y and heads toward the second intersection region 2f, in a region in which the pixel electrode 9a is provided in plan view. The first intersection region 2e is a region where the first light shielding member 2a and the second light shielding member 2b overlap in plan view with each other when the shielding members are extended, and the second intersection region 2f is a region where the third light shielding member 2c and the fourth light shielding member 2d overlap in plan view with each other when the shielding members are extended. Further, the transistor 31 is provided corresponding to the second intersection region 2f, and the pixel electrode 9a is provided corresponding to the transistor 31.

In the exemplary embodiment, at least a part of the semiconductor film 31a of the transistor 31 overlaps in plan view with the second intersection region 2f of the third light shielding member 2c and the fourth light shielding member 2d. Furthermore, the entire semiconductor film 31a overlaps with one of the third light shielding member 2c and the fourth light shielding member 2d. Accordingly, the contact hole 45a that electrically couples the pixel electrode 9a and the transistor 31 is provided at a position overlapping in plan view with the third light shielding member 2c. In the exemplary embodiment, the semiconductor film 31a extends linearly in the second direction Y so as to overlap in plan view with the data line 6a, so the entire semiconductor film 31a overlaps in plan view with the light shielding member 2.

Note that, an aspect in which the semiconductor film 31a extends linearly in the first direction X so as to overlap in plan view with the scanning line 3a, and an aspect in which the semiconductor film 31a is bent at an intermediate position in the longitudinal direction may be adopted. In this case as well, the semiconductor film 31a overlaps in plan view with the light shielding member 2, and at least a part of the semiconductor film 31a overlaps in plan view with the second intersection region 2f of the third light shielding member 2c and the fourth light shielding member 2d.

6. Configuration of Wall Portion 40

Figure 8:
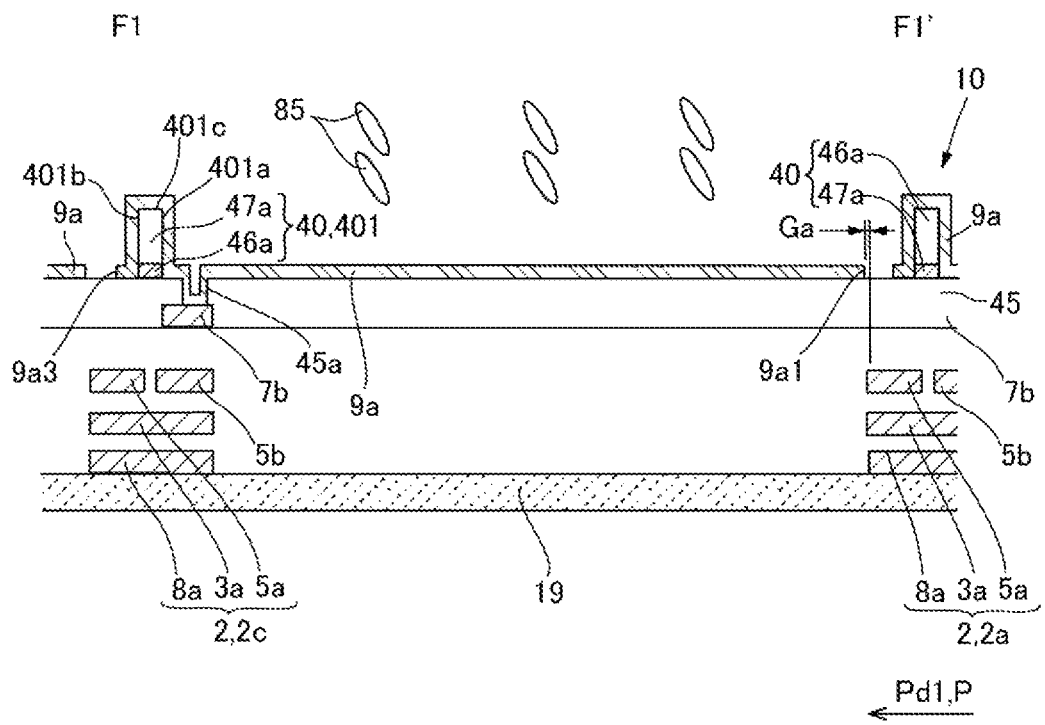
FIG. 8 is an explanatory view schematically illustrating an F1-F1' cross section of FIG. 7.
Figure 9:
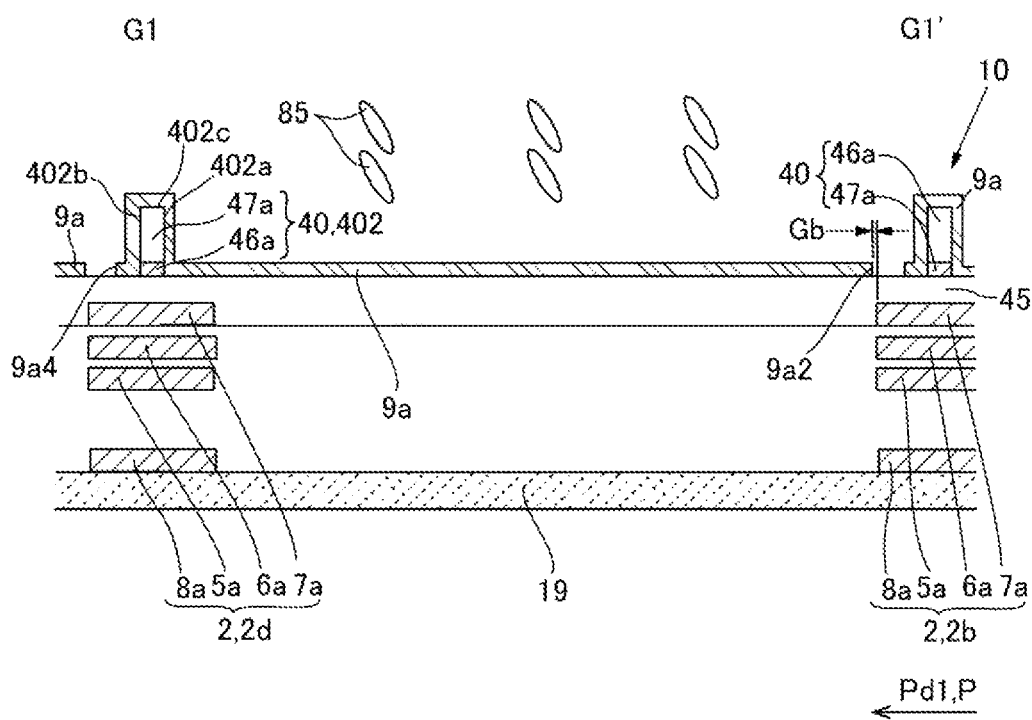
FIG. 9 is an explanatory view schematically illustrating a G1-G1' cross section of FIG. 7.

FIG. 8 is an explanatory view schematically illustrating the F1-F1' cross section of FIG. 7. FIG. 9 is an explanatory view schematically illustrating the G1-G1' cross section of FIG. 7. Note that, in FIG. 8 and FIG. 9, the liquid crystal molecules 85 are also illustrated in order to make it easier to understand a relationship with the orientation direction of the liquid crystal molecules 85.

As illustrated in FIG. 6 and FIG. 7, the wall portion 40 extending along an end portion of the pixel electrode 9a in the first direction X and the second direction Y is provided between a layer provided with the light shielding member 2 and a layer provided with the pixel electrode 9a, and the pixel electrode 9a covers the wall portion 40. In the exemplary embodiment, the wall 40 is provided between the layer provided with the pixel electrode 9a and the inter-layer insulating film 45, and the contact hole 45a that electrically couples the pixel electrode 9a and the transistor 31 is provided so as to penetrate through the inter-layer insulating film 45 at a position overlapping in plan view with the third light shielding member 2c without overlapping in plan view with the wall portion 40.

As illustrated in FIG. 7, FIG. 8, and FIG. 9, the wall portion 40 extends along the third light shielding member 2c and the fourth light shielding member 2d. In the exemplary embodiment, the wall portion 40 extends at a center in a width direction of the third light shielding member 2c and the fourth light shielding member 2d. Here, in a region along the third light shielding member 2c and the fourth light shielding member 2d, a part of the pixel electrode 9a along the third end 9a3, and a part along the fourth end 9a4 overlap with the third light shielding member 2c and the fourth light shielding member 2d, and cover the wall portion 40. In the exemplary embodiment, the pixel electrode 9a is provided along both side surfaces 401a and 401b in the width direction with respect to a first portion 401 of the wall portion 40 that extends in the first direction X along the third light shielding member 2c, and overlaps with an upper surface 401c. In addition, the pixel electrode 9a is provided along both side surfaces 402a and 402b in the width direction with respect to a second portion 402 of the wall portion 40 that extends in the second direction Y along the fourth light shielding member 2d, and overlaps with an upper surface 402c.

In contrast, in a region along the first light shielding member 2a and the second light shielding member 2b, a part of the pixel electrode 9a along the first end 9a1, and a part along the second end 9a2 do not overlap in plan view with the first light shielding member 2a and the second light shielding member 2b, and does not cover the wall portion 40. In the exemplary embodiment, in plan view, a gap Ga is present between the pixel electrode 9a and the first light shielding member 2a, and a gap Gb is present between the pixel electrode 9a and the second light shielding member 2b.

In addition, the wall portion 40 is separated from another pixel electrode 9a adjacent to the pixel electrode 9a in plan view, and do not overlap in plan view with the other pixel electrode 9a. More specifically, in plan view, the wall portion 40 is formed in an L-shape in which the first portion 401 and the second portion 402 are coupled at the second intersection region 2f, and is provided spaced apart from and is not coupled to the wall portion 40 formed to overlap with the other adjacent pixel electrode 9a.

7. Cross-Sectional Structure of Wall Portion 40

As illustrated in FIG. 6 to FIG. 9, the wall portion 40 includes a first layer 46a, and a second layer 47a that is stacked at the first layer 46a so as to overlap with each other in plan view as a whole from the pixel electrode 9a side, and the first layer 46a and the second layer 47a completely overlap. Thus, in the wall portion 40, the side surfaces 401a, 401b, and the side surfaces 402a and 402b are continuous surfaces in a height direction.

Furthermore, the first layer 46a and the second layer 47a are formed of different materials, respectively. For example, the first layer 46a is formed of tungsten silicide (WSi), titanium nitride (TiN), silicon nitride (SiN), silicon, or the like, and the second layer 47a is formed of silicon oxide and the like. The first layer 46a constitutes a lower layer side portion of the wall portion 40, and the second layer 47a constitutes an upper layer side portion of the wall portion 40. A thickness of the second layer 47a is greater than a thickness of the first layer 46a, and a majority of the wall portion 40 is constituted by the second layer 47a. Here, the first layer 46a may be formed of a light shielding material such as tungsten silicide or titanium nitride.

8. Effect of Wall Portion 40 on Lateral Electric Field

Figure 10:
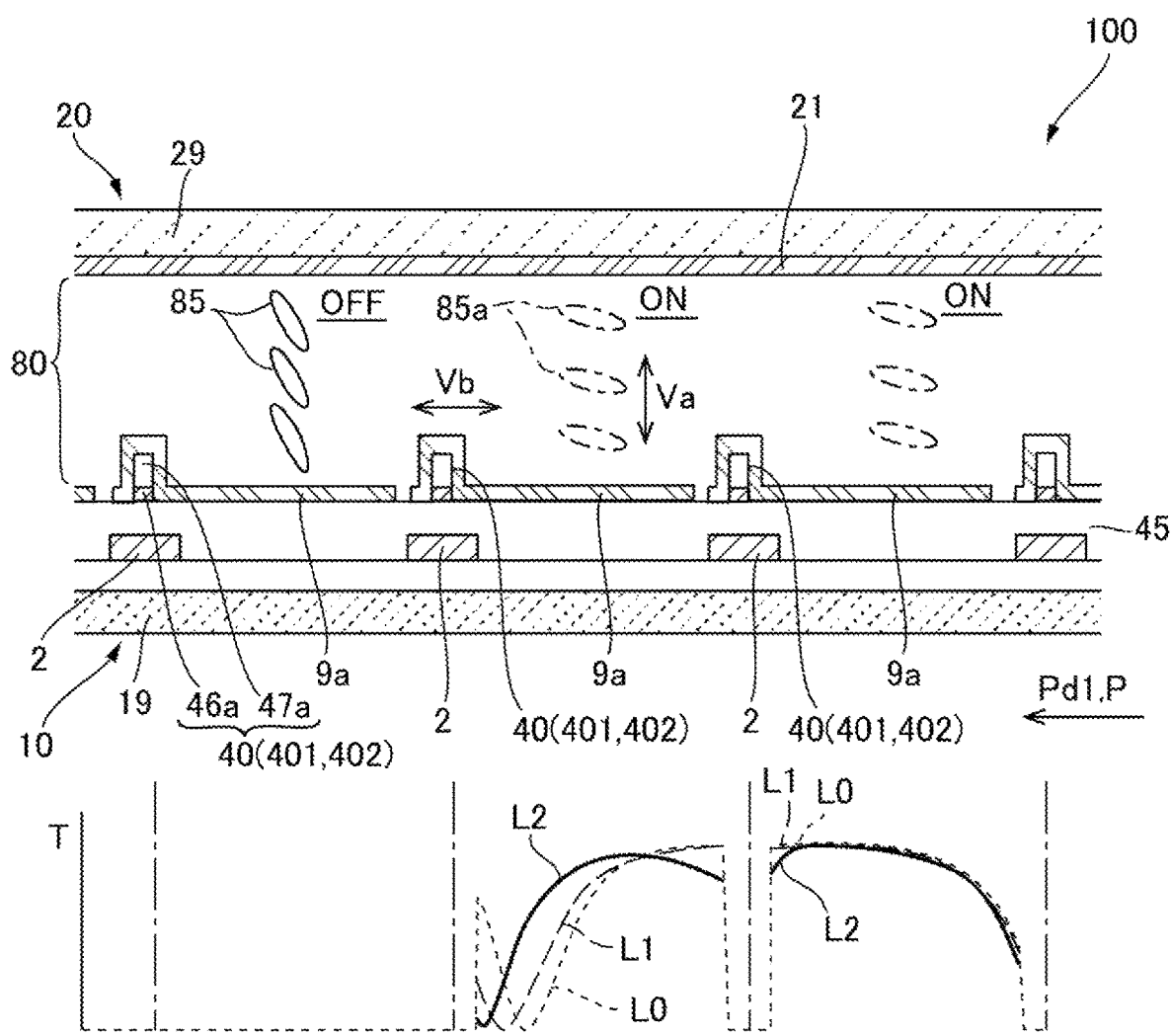
FIG. 10 is an explanatory view illustrating effects of a protruding portion illustrated in FIG. 7 and the like on a lateral electric field.

FIG. 10 is an explanatory view illustrating effects of the wall portion 40 illustrated in FIG. 7 and the like on a lateral electric field. As illustrated in FIG. 10, in the liquid crystal device 100 of the exemplary embodiment, in the first substrate 10, in an orientation corresponding to the orientation direction of the liquid crystal molecules 85, at a boundary with the adjacent pixel 100a, the pixel electrode 9a covers a part of the wall portion 40. Thus, when the liquid crystal device 100 is driven, effects of a lateral electric field on an image is less likely to appear, between a pixel having an off voltage applied to the pixel electrode 9a, and a pixel having an on voltage applied to the pixel electrode 9a.

More specifically, it is assumed that a common potential applied to the common electrode 21 is 0 V, the off voltage of 0 V is applied to the pixel electrode 9a of a pixel in an off state (black display), and the on voltage of 5 V is applied to the pixel electrode 9a of a pixel in an on state (white display). In this case, in the pixel in the on state, the liquid crystal molecules 85 are significantly inclined from a normal line direction for the pixel electrode 9a, due to a vertical electric field (indicated by an arrow Va) between the pixel electrode 9a and the common electrode 21. Here, when a lateral electric field (indicated by an arrow Vb) is generated between the pixel electrode 9a of a pixel in the on state and the pixel electrode 9a of a neighboring pixel in the off state, an inclination of the liquid crystal molecules 85 decreases from the normal line direction of the pixel electrode 9a between adjacent pixels, and a black region (domain region) is to be generated at a position indicated by the portion DO of the pixel in the on state in FIG. 7. However, in the exemplary embodiment, the pixel electrode 9*a* covers the wall portion 40, thus the vertical electric field (indicated by the arrow Va) between the pixel electrode 9*a* and the common electrode 21 is increased, while the lateral electric field (indicated by the arrow Vb) between the pixel electrode 9*a* and the adjacent pixel electrode 9*a* is decreased. Also, the domain region affected by the lateral electric field shifts to a side of a border region of the pixel.

For example, in FIG. 10, results of simulating transmittance T at each position in the pixel, when a thickness of the liquid crystal layer 80 is set to 2.1 µm, and a height of the wall portion 40 is changed to 0 µm, 0.15 µm, and 0.35 µm, are indicated by a short dashed line L0, a long dashed line L1, and a solid line L2. When the wall portion 40 is not formed (when the height of the wall portion 40 is 0 µm), as indicated by the dashed line L0, a domain region in which the transmittance T is decreased due to effects of a vertical electric field is generated at a position separated from an adjacent pixel, and does not overlap with the light shielding member 2.

In contrast, when the height of the wall portion 40 is 0.15 µm, as indicated by the long dashed line L1, a domain region in which the transmittance T is decreased due to effects of a vertical electric field shifts toward an adjacent pixel, and a part of the domain region overlaps with the light shielding member 2. When the height of the wall 40 is 0.35 µm, as indicated by the solid line L2, a domain region in which the transmittance T is decreased due to effects of a vertical electric field is further shifted toward an adjacent pixel, and substantially the entire domain region overlaps with the light shielding member 2. Therefore, in a pixel in the on state, the domain region where the transmittance T is decreased due to the effects of the lateral electric field is to partially or entirely overlap with the light shielding member 2.

9. Method for Manufacturing Liquid Crystal Device 100

Figure 11:
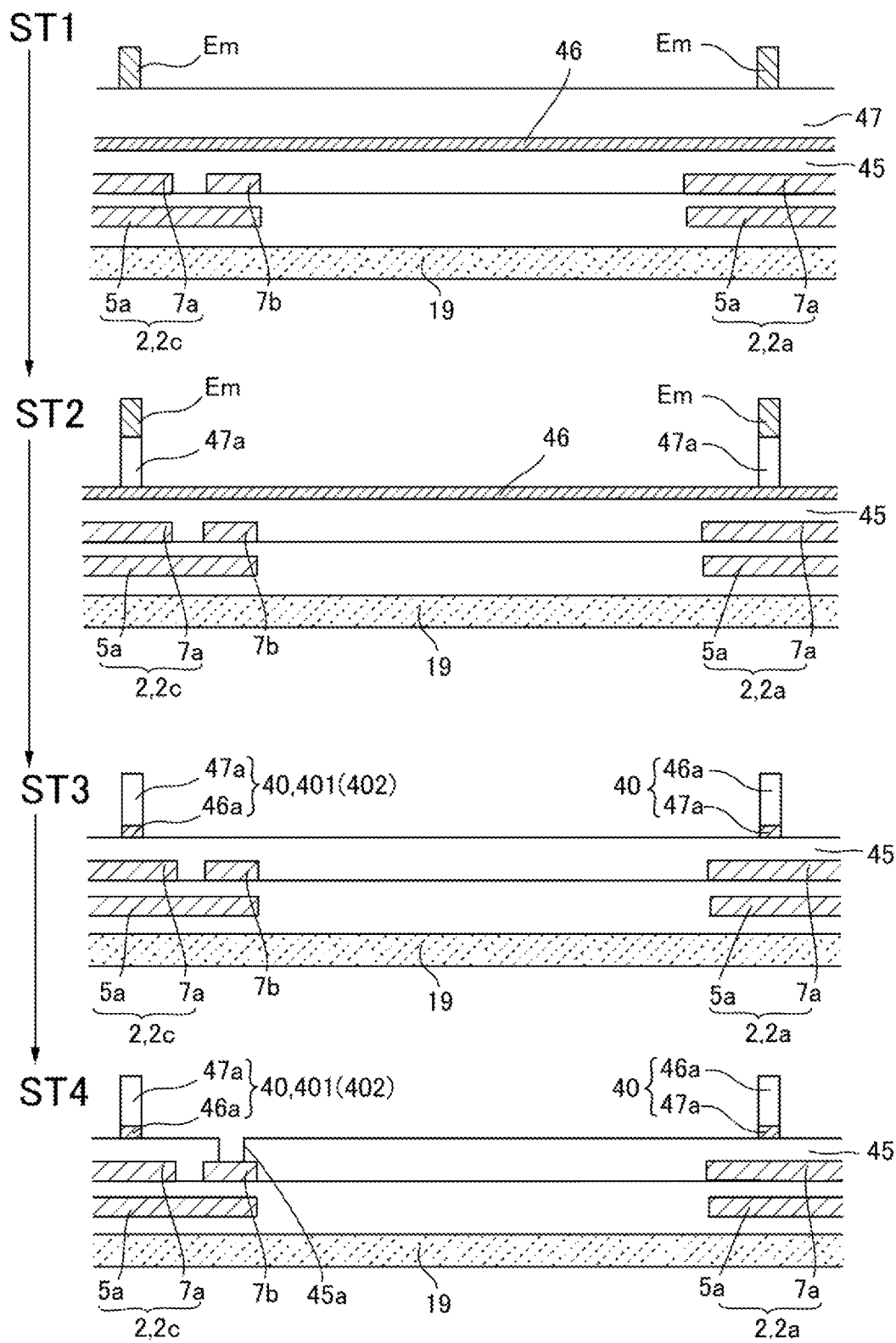
FIG. 11 is a step cross-sectional view illustrating manufacturing steps of the liquid crystal device illustrated in FIG. 1.
Figure 12:
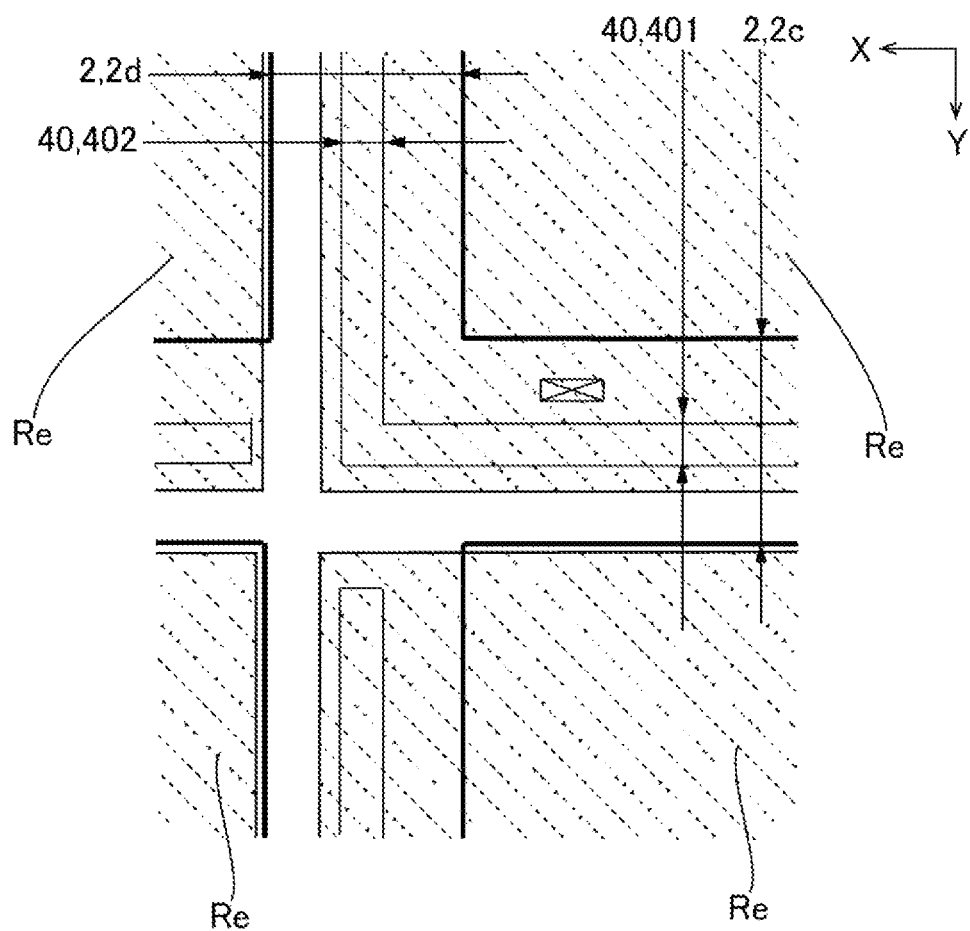
FIG. 12 is an explanatory view illustrating one aspect of a resist mask used in forming the pixel electrode illustrated in FIG. 7.
Figure 13:
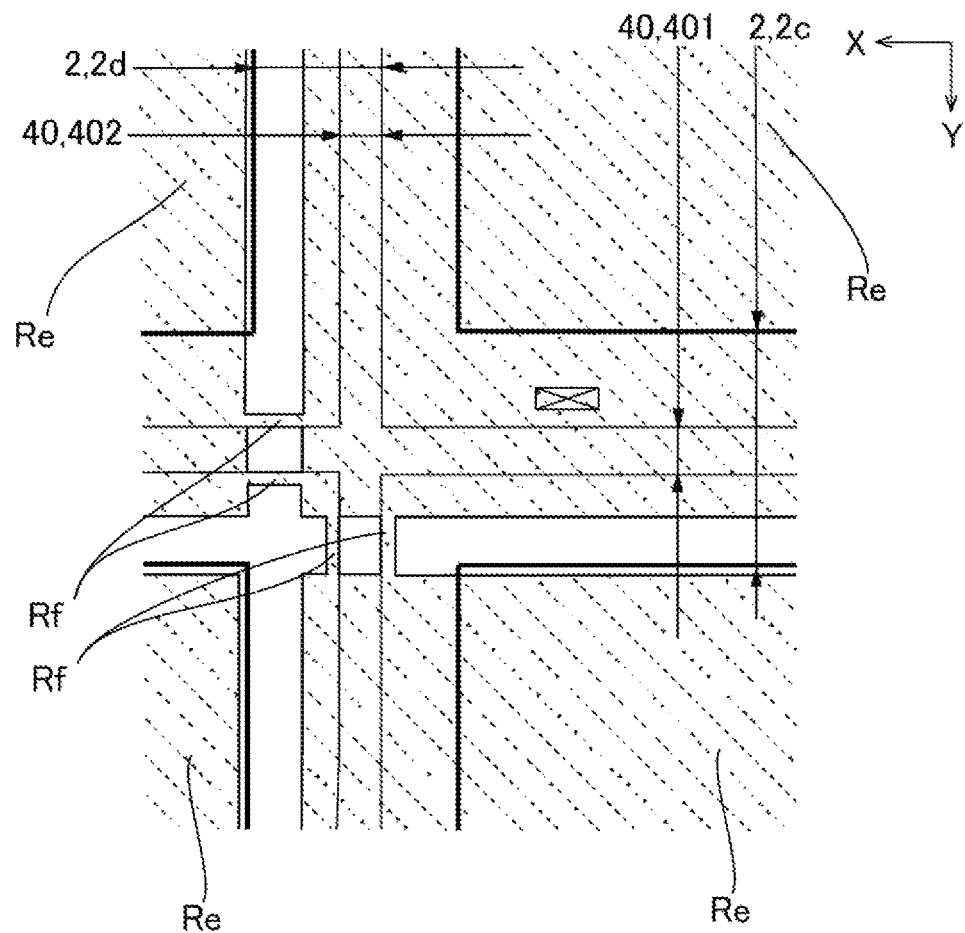
FIG. 13 is an explanatory view illustrating another aspect of the resist mask used in forming the pixel electrode illustrated in FIG. 7.

FIG. 11 is a step cross-sectional view illustrating manufacturing steps of the liquid crystal device 100 illustrated in FIG. 1. FIG. 11 illustrates steps of forming the contact hole 45*a* and the wall portion 40. FIG. 12 is an explanatory view illustrating one aspect of a resist mask Re used in forming the pixel electrode 9*a* illustrated in FIG. 7. FIG. 13 is an explanatory view illustrating another aspect of the resist mask Re used in forming the pixel electrode 9*a* illustrated in FIG. 7. In FIG. 12 and FIG. 13, the resist mask Re is indicated by a region with downward-sloping dashed lines.

In manufacturing the first substrate 10 in the manufacturing steps of the liquid crystal device 100, the wall portion 40 is formed after up to the inter-layer insulating film 45 is formed at the substrate body 19, as illustrated in FIG. 11. In the step for forming the wall portion 40, in a film forming step ST1, after a first film forming step for forming a first film 46 to form a lower layer side portion of the wall portion 40 is performed, a second film forming step for forming a second film 47 for forming an upper layer side portion of the wall portion 40 on an upper layer side of the first film 46 by a material different from the first film 46 is performed. The first film 46 is made of tungsten silicide, titanium nitride, silicon nitride, silicon, and the like, and is formed thin. The second film 47 is made of silicon oxide or the like, and is formed thick. In the exemplary embodiment, the first film 46 is formed of a light shielding material such as tungsten silicide or titanium nitride. Next, an etching mask Em including a resist or the like is formed in a forming region of the wall portion 40.

In a first patterning step ST2, after patterning the second film 47 with the first film 46 as an etching stopper to form the second layer 47*a* that constitutes the upper layer side portion of the wall portion 40, a portion of the first film 46 exposed from the second layer 47*a* is removed, and the inter-layer insulating film 45 is exposed, in a second patterning step ST3. The etching mask Em is removed, and the wall portion 40 including the first layer 46*a* and the second layer 47*a* is formed. By using the first film 46 as the etching stopper, a thickness of the second layer 47*a* can be formed equal to a thickness when the second film 47 is formed. In addition, the thickness of the first layer 46*a* can also be formed equal to the thickness when the first film 46 is formed. As a result, variations in thickness between the first layer 46*a* and the second layer 47*a* can be suppressed in the first substrate 10, and variations in thickness of the wall portion 40 can be suppressed.

In a contact hole forming step ST4, the contact hole 45*a* illustrated in FIG. 6 is formed. In the contact hole forming step ST4, in a state where another etching mask is formed at a surface of the inter-layer insulating film 45 formed in the first patterning step ST2, the inter-layer insulating film 45 is etched.

Next, after a transmissive conductive film such as an ITO film is formed by a sputtering method or the like so as to cover the inter-layer insulating film 45 and the wall portion 40, the conductive film is patterned, and a pixel electrode forming step for forming the pixel electrode 9*a* illustrated in FIG. 7 to FIG. 9 is performed. More specifically, in the pixel electrode forming step, after a photosensitive resist is applied to an upper layer of the conductive film, exposure and development are performed to form the resist mask Re, as illustrated in FIG. 12, and the conductive film is etched in this state. When such a step is performed, the wall portion 40 is spaced apart from the adjacent pixel electrode 9*a* in plan view, on a lower layer side of the conductive film, and is not coupled to the wall portion 40 that overlaps with the adjacent pixel electrode 9*a*. Therefore, unlike a case described below with reference to FIG. 13, the resist masks Re can be formed independently of each other, because the exposure and the development of the photosensitive resist can be performed appropriately. Thus, a short circuit between adjacent pixel electrodes 9*a* can be prevented.

In contrast, as in the example illustrated in FIG. 13, when the wall portions 40 overlapping with the adjacent pixel electrodes 9*a* are coupled, and when exposure to a photosensitive resist is performed, exposure defects occur in the resist positioned on a side surface of the wall portion 40, and after development, a remaining resist Rf is generated on both sides of the wall portion 40, and the resist masks Re may be coupled to each other. In this case, after etching the conductive film, a remainder of the conductive film is generated at a position overlapping with the remaining resist Rf, and a short circuit occurs between adjacent pixel electrodes 9*a*.

10. Main Effects of the Exemplary Embodiment

As described above, in the liquid crystal device 100 of the exemplary embodiment, as described with reference to FIG. 10, on the side corresponding to the pre-tilt direction P of the liquid crystal molecules 85, since the third end 9*a*3 and the fourth end 9*a*4 of the pixel electrode 9*a* cover the wall portion 40, the vertical electric field between the pixel electrode 9*a* and the common electrode 21 is strong, and the lateral electric field generated between the pixel electrode 9*a* and the adjacent pixel electrode 9*a* is weak. In addition, the region where the lateral electric field is generated due to the effects of the adjacent pixel electrode 9*a* shifts toward the boundary region side of the adjacent pixel electrode 9*a*. Thus, even when a disturbance occurs in the orientation of the liquid crystal molecules 85 due to the effects of the lateral electric field, the effects of such a disturbance are less likely to appear on an image. Thus, according to the exemplary embodiment, deterioration in quality of an image caused by the disturbance in the orientation of the liquid crystal molecules 85 caused by the lateral electric field can be appropriately suppressed, and thus, an image with high quality such as a high contrast of a displayed image can be displayed. In addition, the region overlapping in plan view with the pixel electrode 9a, the region where the lateral electric field occurs shifts toward the boundary region side of the adjacent pixel electrode 9a, so a reduction in an amount of display passing through the region overlapping in plan view with the pixel electrode 9a is unlikely to occur. Thus, a bright image can be displayed. Thus, according to the exemplary embodiment, even when the effects of the disturbance in the orientation of the liquid crystal molecules 85 caused by the lateral electric field is suppressed, and a contrast ratio of an image is increased, a bright image can be displayed.

In addition, even when a disturbance occurs in the orientation of the liquid crystal molecules 85 due to the effects of the lateral electric field, a part or all of the region where such a disturbance occurs overlaps with the third light shielding member 2c and the fourth light shielding member 2d. Thus, even when a disturbance occurs in the orientation of the liquid crystal molecules 85 due to the effects of the lateral electric field, such a disturbance can be hidden by the third light shielding member 2c and the fourth light shielding member 2d. Therefore, the effects of the disturbance in the orientation of the liquid crystal molecules 85 are less likely to appear on an image. Thus, according to the exemplary embodiment, deterioration in quality of an image caused by the disturbance in the orientation of the liquid crystal molecules 85 caused by the lateral electric field can be appropriately suppressed, and thus, an image with high quality can be displayed.

Further, the pixel electrode 9a overlaps with the wall portion 40 in the region overlapping with the third light shielding member 2c and the fourth light shielding member 2d, and as a result, an overlapping width of the pixel electrode 9a with the third light shielding member 2c in the second direction Y is greater than an overlapping width with the first light shielding member 2a in the second direction Y, and an overlapping width with the fourth light shielding member 2d in the first direction X is greater than an overlapping width with the second light shielding member 2b in the first direction X. Accordingly, even when a disturbance occurs in the orientation of the liquid crystal molecules 85 due to the effects of the lateral electric field on a side of the third light shielding member 2c and the fourth light shielding member 2d, a wide range of the region where such a disturbance occurs overlaps with the third light shielding member 2c and the fourth light shielding member 2d. Thus, even when a disturbance occurs in the orientation of the liquid crystal molecules 85 due to the effects of the lateral electric field, the effects of such a disturbance are less likely to appear on an image. Thus, according to the exemplary embodiment, an image with high quality can be displayed. Additionally, the pixel electrode 9a does not overlap with the first light shielding member 2a and the second light shielding member 2b on a side on which the effects of the lateral electric field are less likely to occur, thus an amount of display light is less likely to decrease. Thus, a bright image can be displayed.

In addition, because the wall portion 40 includes the first layer 46a, and the second layer 47a formed of the material different from the first layer 46a, the first film 46 can be used as the etching stopper when the second film 47 is patterned by etching to form the second layer 47a, as described with reference to FIG. 11. Thus, in the region overlapping in plan view with the pixel electrode 9a, the second film 47 can be reliably removed other than the part at which the wall portion 40 is formed. Further, in the region overlapping in plan view with the pixel electrode 9a, the first film 46 can be reliably removed other than the part at which the wall portion 40 is formed. Therefore, in each pixel, a film configuration of the region overlapping in plan view with the pixel electrode 9a can be the same, and therefore, variations in retardation of the region overlapping in plan view with the pixel electrode 9a are less likely to occur. Therefore, according to the exemplary embodiment, unnecessary coloring is less likely to occur in an image to be displayed.

In addition, in the wall portion 40, the thickness of the first layer 46a is equal to the thickness when the first film 46 is formed, the thickness of the second layer 47a is equal to the thickness when the second film 47 is formed, and accuracy when the first film 46 is formed, and accuracy when the second film 47 is formed are easier to be controlled compared to an etching amount during etching. Therefore, variations in the height of the wall portion 40 is unlikely to occur, so effects of a lateral voltage can be equalized for each pixel.

Further, the contact hole 45a that electrically couples the transistor 31 and the pixel electrode 9a can be provided in a region overlapping with the third light shielding member 2c, even when the semiconductor film of the transistor 31 for pixel switching is provided so as to overlap with the second intersection region 2f of the third light shielding member 2c and the fourth light shielding member 2d.

Further, the wall portion 40 is spaced apart from the adjacent pixel electrode 9a in plan view, and is not coupled to the wall portion 40 that overlaps with the adjacent pixel electrode 9a. Therefore, even when the first layer 46a of the wall portion 40 is formed of a conductive material such as tungsten silicide, it is possible to prevent the adjacent pixel electrodes 9a from being short-circuited via the first layer 46a. In addition, as described with reference to FIG. 12 and FIG. 13, the exposure and the development of the photosensitive resist can be performed appropriately, as a result, a short-circuit between the adjacent pixel electrodes 9a can be prevented.

In addition, because the wall portion 40 is separated from the adjacent pixel electrode 9a in plan view, a short circuit between the pixel electrodes 9a can be prevented, even when the first layer 46a is a conductive material such as tungsten silicide.

Exemplary Embodiment 2

Figure 14:
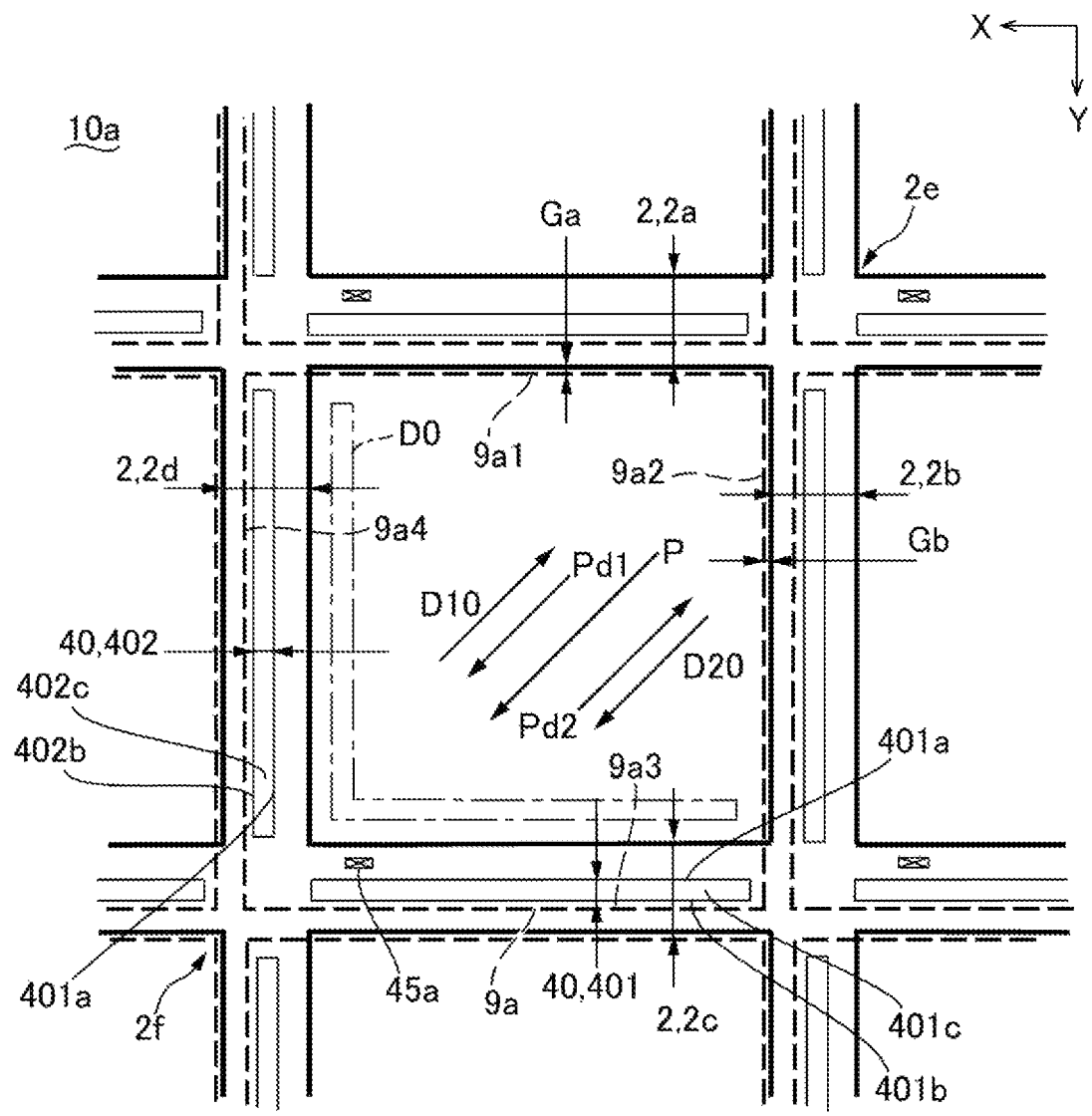
FIG. 14 is an explanatory view of a liquid crystal device according to Exemplary Embodiment 2 of the present disclosure.

FIG. 14 is an explanatory view of the liquid crystal device 100 according to Exemplary Embodiment 2 of the present disclosure, and is an explanatory view schematically illustrating a planar layout of the pixel electrode 9a, the wall portion 40, and the like illustrated in FIG. 5. Note that, basic configurations of the liquid crystal device 100 according to the exemplary embodiment are similar to those of the liquid crystal device 100 according to Exemplary Embodiment 1, and thus, common portions are assigned identical reference signs and a description thereof will be omitted. In Exemplary Embodiment 1, the wall portion 40 has the L-shape where the first portion 401 extending in the first direction X along the third light shielding member 2c, and the second portion 402 extending in the second direction Y along the fourth light shielding member 2d are coupled at the second intersection region 2f in plan view, but in the exemplary embodiment, as illustrated in FIG. 14, the first portion 401 and the second portion 402 are not coupled at the second intersection region 2f in plan view. In other words, the wall portions 40 are provided so as to be separated from each other in a region along the third light shielding member 2c and a region along the fourth light shielding member 2d in plan view, respectively. Even with such a configuration, effects similar to the effects in Exemplary Embodiment 1 are also provided.

Other Exemplary Embodiments

In the exemplary embodiments described above, although the present disclosure is applied to the liquid crystal device in the VA mode, the present disclosure may also be applied to a liquid crystal device in a TN mode, an OCB mode, or the like.

Installation Example to Electronic Apparatus

Figure 15:
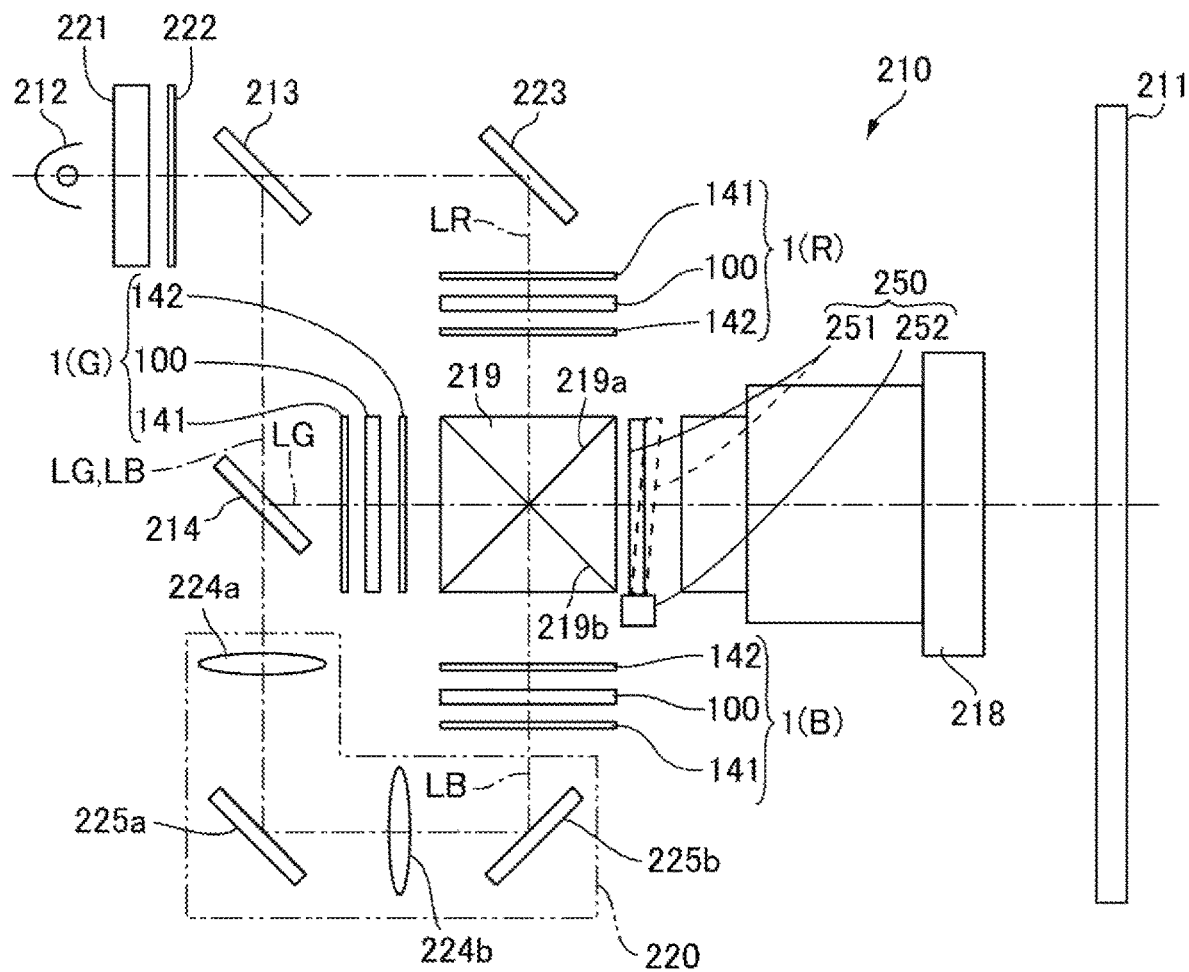
FIG. 15 is a schematic configuration view of a projection-type display apparatus employing a liquid crystal device to which the disclosure is applied.

FIG. 15 is a schematic configuration view of an electronic apparatus employing the liquid crystal device 100 to which the disclosure is applied. Note that, in the descriptions below, although a plurality of light valves (a red light valve 1(R), a green light valve 1(G), and a blue light valve 1(B)) are used to which light in mutually different wavelength regions is supplied, the liquid crystal device 100 to which the disclosure is applied is used in any of the light valves. At this time, a first polarizing plate 141 and a second polarizing plate 142 are disposed in a crossed Nicol state with respect to the liquid crystal device 100.

An electronic apparatus 210 illustrated in FIG. 15 is a forward projection type projector configured to project an image on a screen 211 provided in front of the projector. The electronic apparatus 210 includes a light source unit 212, dichroic mirrors 213, 214, the three light valves (red light valve 1(R), green light valve 1(G), and blue light valve 1(B)), a projection optical system 218, a cross dichroic prism 219 (color synthesis optical system), and a relay system 220.

The light source unit 212 is configured by an extra-high-pressure mercury lamp for supplying light source light including red light, green light, and blue light, for example. The dichroic mirror 213 is configured to be transmissive of red light LR from the light source unit 212 and reflective of green light LG and blue light LB. The dichroic mirror 214 is configured to be transmissive of blue light LB and reflective of green light LG in the green light LG and the blue light LB reflected by the dichroic mirror 213. In this way, the dichroic mirrors 213 and 214 constitute a color separation optical system configured to separate light emitted from the light source unit 212 into red light LR, green light LG, and blue light LB. An integrator 221 and a polarization conversion element 222 are sequentially arranged, between the dichroic mirror 213 and the light source unit 212, from the light source unit 212. The integrator 221 equalizes the illuminance distribution of the light irradiated from the light source unit 212. The polarization conversion element 222 converts the light from the light source unit 212 into linear polarized light having a specific vibration direction such as s-polarized light.

The red light valve 1(R) modulates, in accordance with image signals, the red light LR (illumination light) transmitted through the dichroic mirror 213 and then reflected by a reflecting mirror 223, and emits the modulated red light LR (modulated light) toward the cross dichroic prism 219.

The green light valve 1(G) modulates, in accordance with image signals, the green light LG (illumination light) reflected by the dichroic mirror 213 and then reflected by the dichroic mirror 214, and emits the modulated green light LG (modulated light) toward the cross dichroic prism 219.

The blue light valve 1(B) modulates, in accordance with image signals, the blue light LB (illumination light) reflected by the dichroic mirror 213, transmitted through the dichroic mirror 214, and then passed through the relay system 220, and emits the modulated blue light LB (modulated light) toward the cross dichroic prism 219.

The relay system 220 includes relay micro lenses 224a, 224b, reflection mirrors 225a, and 225b. The relay micro lenses 224a and 224b are provided to prevent the loss of light due to the long optical path of the blue light LB. The relay micro lens 224a is disposed between the dichroic mirror 214 and the reflection mirror 225a.

The relay micro lens 224b is disposed between the reflection mirrors 225a and 225b. The reflection mirror 225a is disposed to reflect, toward the relay micro lens 224b, the blue light LB transmitted through the dichroic mirror 214 and then emitted from the relay micro lens 224a. The reflection mirror 225b is disposed to reflect the blue light LB emitted from the relay micro lens 224b toward the blue light valve 1(B).

The cross dichroic prism 219 serves as a color combining optical system in which two dichroic films 219a and 219b are orthogonally arranged in an X shape. The dichroic film 219a reflects the blue light LB and transmits the green light LG. The dichroic film 219b reflects the red light LR and transmits the green light LG.

Accordingly, the cross dichroic prism 219 is configured to synthesize the red light LR, the green light LG, and the blue light LB modulated by the red light valve 1(R), the green light valve 1(G), and the blue light valve 1(B) respectively and to emit the synthesized light toward the projection optical system 218. The projection optical system 218, which includes a projection micro lens (not illustrated), is configured to project the light synthesized by the cross dichroic prism 219 onto the screen 211.

Further, the electronic apparatus 210 of the exemplary embodiment is provided with an optical path shifting device 250 for displaying a projection image with a resolution higher than a resolution of the liquid crystal device 100, by shifting display light in a plane orthogonal to an optical axis. Here, the optical path shifting device 250 shifts the display light in a uniaxial direction or a biaxial direction in the plane orthogonal to the optical axis. The shift in the uniaxial direction or the biaxial direction of the displayed light corresponds to a shift of the pixels of the liquid crystal device 100, thus by applying the liquid crystal device 100 that suppresses effects of a lateral electric field, a resolution can be improved, and a high-quality projection image can be displayed. FIG. 15 illustrates an aspect in which the optical path shifting device 250 that shifts display light in a uniaxial direction in a plane orthogonal to an optical axis is disposed between the cross dichroic prism 219 and the projection optical system 218.

The optical path shifting device 250 includes a transmission member 251 having a parallel plate shape, and a driving portion 252 that changes an inclination of the transmission member 251. The transmission member 251 is an optical element that generates refraction inside when transmitting light, and moves an optical axis of the transmitted light, and is constituted by a glass plate or the like. The driving portion 252 is constituted by a piezoelectric element or the like. With such a configuration, a projection image with a high resolution is achieved, by shifting a position of an image of each pixel in display light on a time base.

Other Electronic Apparatuses

In the liquid crystal device 100 to which the present disclosure is applied, a projection-type display apparatus may be configured to use, as a light source unit, an LED light source or a laser light source configured to emit light in various colors, and the like to supply light in various colors emitted from the light source to another liquid crystal apparatus. The liquid crystal device 100 may be used, not only in the forward projection type projector that projects a projection image from an observing side, but also in a backward projection type projection type projector that projects a projection image from a side opposite to an observing side.

Further, the electronic apparatus to which the liquid crystal device 100 is applicable is not limited to the electronic apparatus 210. For example, the liquid crystal device 100 may be used as a projection-type head-up display (HUD), a direct viewing-type head-mounted display (HMD), and a display unit of an information terminal device such as an electronic book, a personal computer, a digital camera, a liquid crystal television, a view finder-type or a monitor direct viewing type video recorder, a car navigation system, an electronic note book, and POS.

What is claimed is:

1. A liquid crystal device, comprising:
   a liquid crystal layer including liquid crystal molecules;
   a pixel electrode including
   a first end extending along a first direction,
   a second end intersecting the first end, and extending along a second direction,
   a third end intersecting the second end, and extending along the first direction, and
   a fourth end intersecting the first end and the third end, and extending along the second direction;
   a transistor provided corresponding to the pixel electrode;
   a first light shielding member extending along the first direction;
   a second light shielding member intersecting the first light shielding member, and extending along the second direction;
   a third light shielding member intersecting the second light shielding member, and extending along the first direction;
   a fourth light shielding member intersecting the first light shielding member and the third light shielding member, and extending along the second direction; and
   a wall portion extending along the third end and the fourth end of the pixel electrode, and covered with the pixel electrode, wherein
   the wall portion includes
   a first layer and
   a second layer stacked, from the pixel electrode side, at the first layer so that the second layer entirely overlaps the first layer in plan view,
   the second layer includes a material different from the first layer, and is thicker than the first layer,
   the pixel electrode is provided such that an end portion thereof is aligned with each of the first light shielding member, the second light shielding member, the third light shielding member, and the fourth light shielding member, and
   the wall portion extends along the end portion of the pixel electrode between a layer provided with the first light shielding member, the second light shielding member, the third light shielding member, and the fourth light shielding member, and a layer provided with the pixel electrode.

2. The liquid crystal device according to claim 1, wherein the first layer includes a light shielding material.

3. The liquid crystal device according to claim 1, wherein the wall portion is provided apart from a pixel electrode adjacent to the pixel electrode in plan view.

4. The liquid crystal device according to claim 1, wherein the transistor is provided corresponding to an intersection region of the third end and the fourth end.

5. The liquid crystal device according to claim 4, wherein in a region in which the pixel electrode is provided, in plan view, an orientation direction of the liquid crystal molecules is set in a direction toward the intersection region, the direction intersecting the first direction and the second direction, and
the first end and the second end of the pixel electrode do not overlap the wall portion.

6. The liquid crystal device according to claim 4, wherein the liquid crystal molecules have negative dielectric anisotropy, and
the liquid crystal molecules are inclined with respect to a normal line direction of the pixel electrode such that a first end portion of the liquid crystal molecule opposite to the pixel electrode is positioned closer to a side of the intersection region than a second end portion on the pixel electrode side.

7. The liquid crystal device according to claim 1, wherein the pixel electrode is provided along both side surfaces of the wall portion so as to cover the wall portion.

8. An electronic apparatus, comprising:
the liquid crystal device according to claim 1; and
an optical path shifting device.

* * * * *